United States Patent
Ambeskar et al.

(10) Patent No.: US 12,284,633 B2
(45) Date of Patent: Apr. 22, 2025

(54) EFFICIENT BANDWIDTH UTILIZATION FOR COMMUNICATION SYSTEMS

(71) Applicant: Hughes Network Systems, LLC, Germantown, MD (US)

(72) Inventors: Nimesh P. Ambeskar, Germantown, MD (US); Ashritha Mohan Ram, Germantown, MD (US); John Border, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 717 days.

(21) Appl. No.: 17/385,074

(22) Filed: Jul. 26, 2021

(65) Prior Publication Data

US 2023/0029644 A1 Feb. 2, 2023

(51) Int. Cl.
*H04W 72/0446* (2023.01)
*H04B 7/185* (2006.01)
(Continued)

(52) U.S. Cl.
CPC .... *H04W 72/0446* (2013.01); *H04B 7/18582* (2013.01); *H04B 7/2123* (2013.01); *H04W 72/1268* (2013.01)

(58) Field of Classification Search
CPC .......... H04W 72/0446; H04W 72/1268; H04B 7/18582; H04B 7/2123
See application file for complete search history.

(56) References Cited

U.S. PATENT DOCUMENTS

| 3,730,998 A | 5/1973 | Schmidt et al. |
| 5,450,413 A | 9/1995 | Hazama |

(Continued)

FOREIGN PATENT DOCUMENTS

| EP | 2853043 A1 | 4/2015 |
| WO | WO 2013177374 A1 | 11/2013 |

OTHER PUBLICATIONS

International Preliminary Report on Patentability in International Appln. No. PCT/US2022/038208, mailed on Feb. 8, 2024, 9 pages.

(Continued)

*Primary Examiner* — Michael Thier
*Assistant Examiner* — Nevena Zecevic Sandhu
(74) *Attorney, Agent, or Firm* — Fish & Richardson P.C.

(57) ABSTRACT

Methods, systems, and apparatus, including computer programs encoded on computer storage media, for dynamically reducing an aperture size to reduce overhead. For example, a server can receive a first transmission from a first terminal through a communication network. The server can determine a timing offset associated with the first terminal based on the first transmission. The server can determine an aperture window size for an aperture window for the first terminal based on the determined timing offset associated with the first terminal. The server can generate allocation data that assigns communication resources to one or more terminals that includes the first terminal, the allocation data being based on the determined aperture window size for the first terminal. The server can communicate with the one or more terminals to indicate the communication resources respectively allocated to the one or more terminals.

22 Claims, 9 Drawing Sheets

(51) Int. Cl.
*H04B 7/212* (2006.01)
*H04W 72/1268* (2023.01)

(56) References Cited

U.S. PATENT DOCUMENTS

| | | | |
|---|---|---|---|
| 5,898,743 A * | 4/1999 | Shoji | H04J 3/0608 |
| | | | 370/514 |
| 7,656,813 B2 | 2/2010 | Kloper | |
| 8,687,493 B2 | 4/2014 | Torres et al. | |
| 8,705,357 B2 | 4/2014 | Torres et al. | |
| 8,831,121 B1 | 9/2014 | Qi et al. | |
| 9,166,675 B2 * | 10/2015 | Bhaskar | H04B 7/2125 |
| 9,172,458 B2 | 10/2015 | Ragland et al. | |
| 9,591,595 B2 | 3/2017 | Steber et al. | |
| 9,621,204 B2 | 4/2017 | Qi et al. | |
| 9,942,895 B2 | 4/2018 | Border | |
| 10,812,250 B2 | 10/2020 | Lee et al. | |
| 11,165,622 B2 | 11/2021 | Ambeskar et al. | |
| 2004/0120349 A1 | 6/2004 | Border et al. | |
| 2005/0119019 A1 * | 6/2005 | Jang | H04W 4/14 |
| | | | 455/414.1 |
| 2008/0225984 A1 * | 9/2008 | Ahmed | H04L 25/06 |
| | | | 375/302 |
| 2012/0093072 A1 | 4/2012 | Ragland et al. | |
| 2018/0219979 A1 | 8/2018 | Javali et al. | |
| 2021/0028878 A1 | 1/2021 | Border | |
| 2021/0203427 A1 | 7/2021 | Ambeskar et al. | |

OTHER PUBLICATIONS

International Search Report and Written Opinion in International Appln. No. PCT/US2022/038208, dated Nov. 8, 2022, 15 pages.

* cited by examiner

EFFICIENT BANDWIDTH UTILIZATION FOR COMMUNICATION SYSTEMS

BACKGROUND

Many systems utilize various bandwidth techniques to allocate resources to various devices in a communication system. Bandwidth utilization techniques can be typically made by performing calculations that take into account various parameters associated with each of the devices connected over a network.

SUMMARY

In some implementations, a communication system can acquire signal data from a terminal during a timing window. The communication system can correspond to a satellite communication system that includes multiple terminals, a gateway system, and a satellite that relays communications between the multiple terminals and the gateway system. Each of the multiple terminals can connect to one or more client devices that can request or provide data, which is then transmitted over the satellite to the gateway system.

In some implementations, each of the terminals can transmit data to the gateway over the satellite using a Multi-Frequency Time Division Multiple Access (TDMA) communication scheme. In particular, the TDMA scheme utilizes a concept of frames. A frame is a standard unit of time for distributing bandwidth in distinct time slots among terminals. Each frame can be divided into an integral number of slots and each slot is a set length of symbols. Additionally the TDMA scheme allows multiple terminals in the satellite communication system to share the same channel frequency bandwidth. Thus, in the satellite communication system, multiple terminals can communicate, e.g., transmit and receive data, through the satellite to the gateway using the TDMA scheme.

The gateway can dictate bandwidth allocations for each of the terminals. In particular, the gateway can determine an amount of channel bandwidth each terminal will receive on a per-frame basis. Moreover, the gateway gives each terminal a continuous number of burst assignments allocated to transmit. A burst assignment can include an integer number of slots. Within each burst assignment, a terminal inserts a terminal or data burst. The terminal burst consists of various symbol schemes, e.g., a radio on/ramp up, unique words, radio down/ramp down, pilot symbols, and payload data, useful for transmitting data. In between each terminal burst, the terminal inserts a buffer period. The buffer period allows for improved detection within the timing or aperture window defined by the gateway. The buffer period corresponds to an intentional delay, waiting time, or time offset between subsequent terminal bursts. The gateway provides each terminal a Burst Allocation Packet (BAP) that indicates in which allocated slots the terminal can transmit. Additionally, the gateway provides a Burst Time Plan (BTP) to its demodulator for each of the terminals, so the demodulator can track when a burst is expected to be received.

In some implementations, timing synchronization is an important aspect of the satellite communication system. In particular, timing synchronization is essential for the terminal bursts to arrive at the gateway at the specified times as submitted by the BTPs to the demodulator. The satellite communication system can use a closed loop timing system to guarantee that the terminal's burst arrives in a timely manner at the demodulator.

Although timing can be synchronized between the terminals and the gateway, some variability exists in the satellite movement that creates synchronization issues. The motion of the satellite can cause a variability in the arrival time of the terminal's burst at the gateway. Other time issues exist such as time jitter at the terminals and misaligned time at the demodulator's receiver. Because of these timing uncertainties, a small window of time is required by the demodulator within the gateway to identify a unique word within the terminal burst. This window of time is known as the aperture window.

During the aperture window, the gateway expects the burst to arrive from the terminal and tries to identify the unique word within the terminal burst to detect the terminal burst. The gateway can measure the delay caused by the satellite motion (and other timing information) to derive an aperture for each particular terminal. For example, when a terminal first comes online, that terminal and the gateway are not in time synchronization. The terminal and the gateway do not know the timing offset when the two devices communicate with one another. To initiate the synchronization, the gateway uses a larger aperture to determine the timing offset. The terminal first sends a bootstrap message or a setup message to the gateway through the satellite. After the gateway receives the bootstrap message, the gateway processes the message to determine the timing offset. Then, the gateway transmits the timing offset corrections to the terminal so that the gateway can apply smaller aperture windows, e.g., normal apertures, for subsequent transmissions, e.g., terminal bursts. At this point, the terminal and the gateway are in steady state and data transmissions can be detected properly by the gateway.

In some implementations, various aperture window sizes can have implications in overhead for the satellite communication system. For example, higher aperture lengths in time can lead to higher aperture sizes in symbols for higher data rate channels. Said another way, a terminal can transmit more data in a high-speed channel when a smaller aperture window is used. Thus, the overall gateway throughput is the data that is pushed from each of the terminals. The overall gateway will be impacted by the size and uncertainty of the aperture window. The greater the size of the aperture window, the more the overhead in between terminal bursts because the terminal cannot transmit payload data during the aperture window.

More overhead can lead to a decrease in bits/Hz (bandwidth) utilization for higher symbol rates in comparison to lower symbol rates. Practically, many terminals have small timing offsets as measured by the demodulator in the gateway. Consequently, these terminals can transmit with a smaller aperture (e.g., reduced overhead in the terminal burst) defined at the gateway. With the use of smaller aperture, higher symbol rate channels can be more efficiently utilized.

The techniques in this specification describe dynamically reducing the aperture size to increase bandwidth utilization for higher symbol rates in communication channels. Specifically, the gateway can adjust the aperture size based on (i) knowledge of a terminal's timing offset based on just having received a burst from the terminal and (ii) based on assuming the terminal can make an adjustment sent to it as a timing correction. The aperture size can vary for each terminal. Moreover, one technique describes dynamically reducing the aperture size based on the terminal's timing offset and the maximum satellite drift thereby increasing the return channel throughput (bits/Hz) for higher symbol rates by reducing the burst overhead. In another technique, this specification describes reducing aperture lengths for all terminals using a return channel for "N" consecutive frames. Another technique below discusses reducing aperture size based on the maximum satellite drift only as well as moving the aperture open symbol to center on the terminal's timing offset and using a reduced aperture size to increase return channel throughput for higher symbol rates. In another technique, the specification describes moving the aperture open symbol and using a reduced aperture size for all terminals on a return channel based on their timing offset.

In some implementations, the terminals can reduce the size of the overhead in the terminal burst. In response to receiving timing offset correction information from the gateway, the terminals can adjust the size of the overhead in a terminal burst. Meanwhile, the gateway reduces the size of its aperture window for that particular terminal. This leads to an improvement in bandwidth utilization since the gateway can receive a terminal burst and its reduced aperture window falls on the start of the burst and minimizes the amount of symbols included from the payload of the terminal burst.

In some implementations, one method of dynamically reducing the aperture size includes utilizing the terminal's known timing offset to calculate the aperture size for subsequent stream allocations. The timing offset may differ from terminal to terminal, which would result in different calculated aperture sizes. In particular, the gateway can perform the following procedures to reduce the aperture size for a particular terminal. For each terminal, the gateway can determine the terminal's initial timing offset. Afterwards, the gateway can determine an aperture size for the particular terminal using the start data from the terminal burst. The gateway can provide timing correction information to each particular terminal using the BAP.

Additionally, the gateway can generate and provide a BTP for each terminal to the demodulator, so the demodulator is aware of the subsequent transmissions from each terminal. For the next set preconfigured amount of frames received for a particular terminal, the gateway can employ the generated aperture size and overhead information for each subsequent burst received. After the gateway has received the preconfigured amount of frames from the particular terminal, the gateway reuses a normal aperture to recalculate a new reduced aperture size based on the terminal's current timing offset and applies the new reduced aperture size for the preconfigured amount of frames. This process repeats for each of the terminals in the satellite communication system.

In some implementations, another method of dynamically reducing the aperture window includes the gateway using a reduced aperture size based on a time delay introduced by a maximum satellite drift. As will be further described below, the gateway adjusts an aperture open symbol e.g., the first symbol where the unique word can begin and where the demodulator begins looking for the unique word of a burst, based on the known terminal timing offset. In particular, the gateway would perform the following procedures to reduce the aperture size for a particular terminal.

First, the gateway can determine the terminal's initial timing offset. Afterwards, the gateway can determine an aperture size for the particular terminal based on the timing delay introduced by the maximum satellite drift. The gateway can provide the BAP to each terminal for subsequent terminal burst transmissions. Additionally, the gateway can generate and provide a BTP for each terminal to the demodulator, so the demodulator is aware of the subsequent transmissions from each terminal. At this point, the demodulator can calculate the aperture open symbol based on the terminal's current timing offset so that the subsequent allocations can target the terminal's timing offset to be located at the center of the aperture window. This method can utilize a reduced aperture window size for a majority of the burst allocations from each of the terminals.

In one general aspect, a method performed by one or more computing devices includes: receiving, by the one or more computers, a first transmission from a first terminal through a communication network; determining, by the one or more computers, a timing offset associated with the first terminal based on the first transmission; determining, by the one or more computers, an aperture window size for an aperture window for the first terminal based on the determined timing offset associated with the first terminal, the aperture window defining a time range for the one or more computers to search for an identifier that specifies a beginning of a data burst in a transmission from the first terminal; generating, by the one or more computers, allocation data that assigns communication resources to one or more terminals that includes the first terminal, the allocation data being based on the determined aperture window size for the first terminal; and communicating, by the one or more computers, with the one or more terminals to indicate the communication resources respectively allocated to the one or more terminals.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein the one or more computers comprises a satellite gateway.

In some implementations, the method includes wherein communicating with the one or more terminals to indicate the communication resources respectively allocated to the one or more terminals further comprises providing, by the one or more computers, second data representing the determined timing offset to the first terminal.

In some implementations, the method includes providing, by the first terminal, a second transmission that comprises timing adjustments based on the allocation data generated by the one or more computers, wherein the timing adjustments includes adjustments to a buffer period or overhead between data bursts.

In some implementations, the method includes receiving, by the one or more computers, the second transmission from the first terminal through the communication network; determining, by the one or more computers, a second timing offset associated with the first terminal based on the second transmission, wherein the determined second timing offset is smaller than the determined timing offset; and determining, by the one or more computers, a second aperture window size for a second aperture window for the first terminal based on the determined second timing offset associated with the first terminal, the second aperture window defining a second time range for the one or more computers to search for the identifier that specifies a beginning of a data burst in a transmission from the first terminal, wherein searching for the identifier further comprises: correlating, by the one or more computers, the identifier with one or more signals in the second transmission during the second aperture window to identify the identifier.

In some implementations, the method includes wherein determining the aperture window size for the aperture window for the first terminal based on the determined timing offset associated with the first terminal further comprises: adjusting, by the one or more computers, the aperture window size of the aperture window using the determined timing offset associated with the first terminal to synchronize transmission and reception timing between the one or more computers and the first terminal.

In some implementations, the method includes wherein the determined timing offset associated with the first terminal comprises (i) a time difference between the first terminal and the one or more computers and (ii) a time delay associated with a drift of a satellite, the satellite acting as a communication pathway between the first terminal and the one or more computers.

In some implementations, the method includes wherein generating the allocation data comprises allocating resources for a data burst to be transmitted by the first terminal, wherein the allocation for the data burst comprises allocation time for (i) an overhead portion, (ii) radio ramp up, (iii) the identifier, (iv) a data payload for the data burst, (v) one or more pilot symbols, and (vi) radio ramp down.

In some implementations, the method includes wherein receiving the first transmission from the first terminal comprises: in response to receiving the first transmission from the first terminal, accessing, by the one or more computers, a short aperture window from an aperture window database, the aperture window database comprising data representing a plurality of aperture windows; correlating, by the one or more computers, the identifier assigned to the first terminal against one or more data bursts in the first transmission within a time range identified by the short aperture window; identifying, by the one or more computers, a correlation time associated with an end symbol of the identifier for the first terminal from the correlation; and determining, by the one or more computers, the timing offset by comparing the correlation time to an expected time, where the expected time represents a time the one or more computers expects to identify the data burst for the first terminal, the expected time comprising a time the data burst is expected to be received, a length of time for the overhead, a length of time for the data representing the radio on, and a length of time for the identifier.

In some implementations, the method includes in response to determining the timing offset by comparing the correlation time to the expected time, generating, by the one or more computers, a burst time plan (BTP) that indicates when the one or more computers is expected to receive subsequent data bursts and the first terminal the subsequent data bursts belongs, the BTP corresponding to an aperture window for the first terminal; generating, by the one or more computers, a burst allocation packet (BAP) that indicates a burst allocation time which the first terminal is to insert a data burst into a slot in third data; providing, by the one or more computers, second data representing the timing offset associated with each of the terminals to each of the terminals; providing, by the one or more computers, the BAP to the first terminal; and in response to receiving the third data from the one or more terminals, processing, by the one or more computers, the third data using the generated BTP.

In some implementations, the method includes wherein processing the third data using the BTP further comprises: processing, by the one or more computers, the third data using the BTP, and the one or more computers continues processing subsequent received data from the first terminal for a set amount of frames; in response to receiving the set amount of frames, applying, by the one or more computers, a general aperture window for the first terminal for processing a next frame of data; adjusting, by the one or more computers, a size of the general aperture window based on a current timing offset for the first terminal; and applying, by the one or more computers, the adjusted size of the aperture window for the set amount of frames in subsequent received data for the first terminal.

In some implementations, the method includes in response to determining the timing offset by comparing the correlation time to an expected time, generating, by the one or more computers, a BTP that indicates when the one or more computers is expected to receive subsequent data bursts and the first terminal the subsequent data bursts belongs, the BTP corresponding to an aperture window for the first terminal; generating, by the one or more computers, a burst allocation packet (BAP) that indicates a burst allocation time which the first terminal is to insert a data burst into a slot in third data; providing, by the one or more computers, the BAP to the first terminal; and in response to (i) providing the BAP to the first terminal, (ii) not providing the timing offset to the first terminal, and (iii) receiving the third data from the one or more terminals, processing, by the one or more computers, the third data using the generated BTP, where the third data includes a timing offset similar to the determined timing offset found in the first transmission.

In some implementations, the method includes in response to determining the timing offset by comparing the correlation time to an expected time, adjusting, by the one or more computers, a center of the aperture window to be a time identified by the determined timing offset; determining, by the one or more computers, a width of the aperture window by comparing timing offsets between subsequent slots for the particular terminal, the determined width of the aperture window corresponding to a delay caused by a maximum drift of a satellite positioned between the one or more terminals and the one or more computers; and designating, by the one or more computers, a new aperture window for subsequent received slots for the first terminal using the adjusted center and the determined width.

In some implementations, the method includes wherein the aperture window is centered on either (i) a boundary between two slots in a frame or (i) at the end of the identifier in the data burst for each of the terminals.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
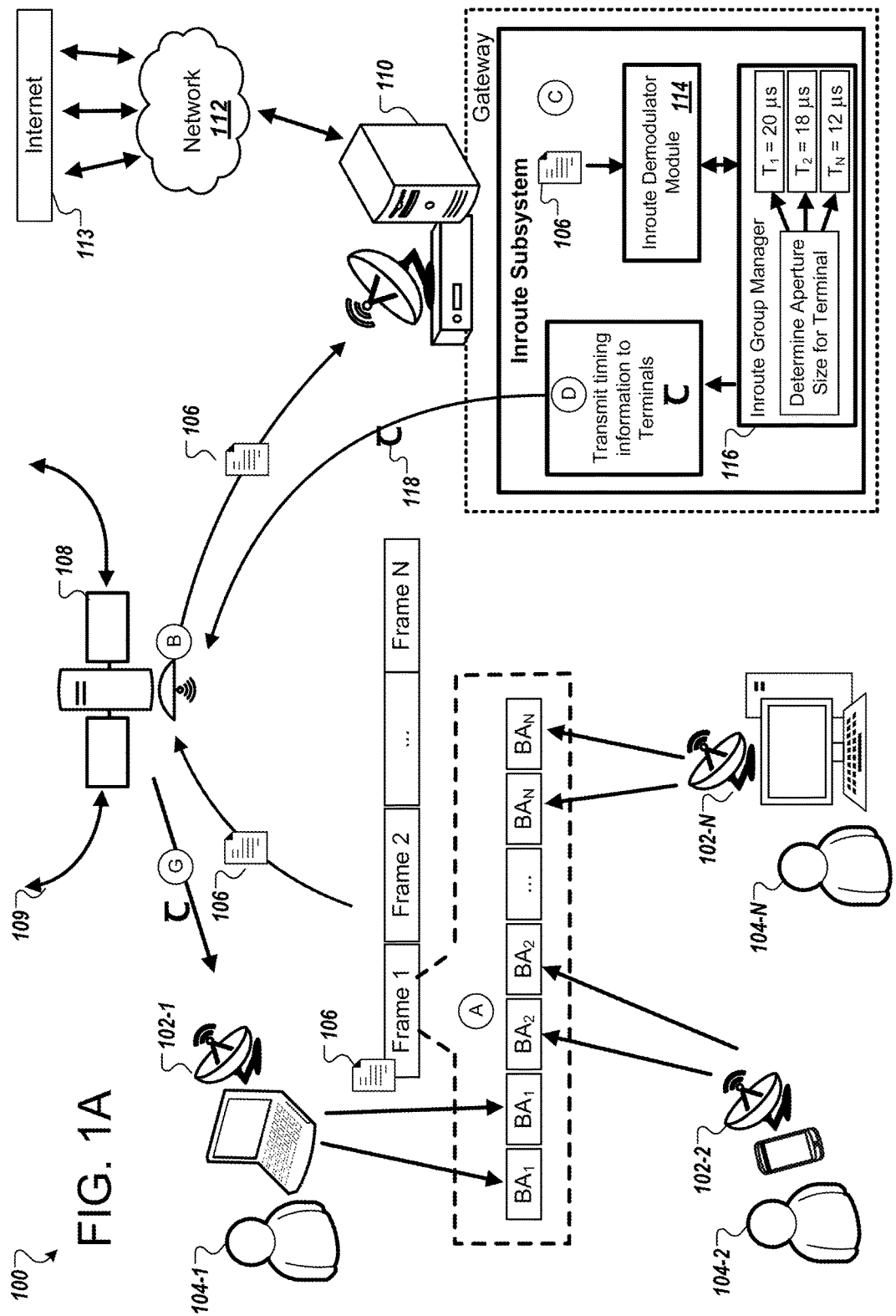
FIG. 1A is a block diagram that illustrates an example of a system for adjusting a size of an aperture window using timing information.

FIG. 1A is a block diagram that illustrates an example of a system 100 for adjusting a size of an aperture window using timing information. The example of FIG. 1A shows a satellite communication system, but the techniques described here can be used in other communication systems. The system 100 includes a gateway 110 that communicates with a satellite 108, and the satellite 108 communicates with various satellite terminals 102-1 through 102-N (collectively terminals "102"). The satellite 108 and the gateway 110 (along with other network components) can cooperate to transfer data to and from the terminals 102 to a network 112, which can include and communicate with the Internet 113. Each of the terminals 102-1 through 102-N can be in communication with one or more client devices, such as hand-held devices, telephones, laptop computers, desktop computers, Internet of Things (IoT) devices, and so on, which make use of the network connections the terminals 102-1 through 102-N, the satellite 108, and the gateway 110. FIG. 1A illustrates various operations in stages (A) through (D) which can be performed in the sequence indicated or in another sequence.

In the example of FIG. 1A, the gateway 110 includes an inroute subsystem (among other components). The inroute subsystem can manage the received traffic from each of the terminals via the satellite link. In particular, the inroute subsystem can include an Inroute Demodulator Module (IDM) 114 and an Inroute Group Manager (IGM) 116. The IDM 114 performs a majority of Layer 1 functionality. Layer 1 functionality includes, for example, bit manipulation, bit synchronization, symbol delivery, and other functions manipulated in the Layer 1 level. The IGM 116 performs the majority of Layer 2 functionality. Layer 2 functionality includes, for example, packet reassembly, bandwidth allocation, error-free transmission, frame synchronization, and other functionality manipulated in the Layer 2 level.

The system 100 can use a Multi-Frequency Time Division Multiple Access (TDMA) communication scheme. In particular, the gateway 110 can generate an allocation of bandwidth to the terminals 102 through the allocation of burst assignment consisting of multiple slots in the TDMA communication scheme. The IGM 116 (or another component) of the gateway 110 can be responsible for allocating burst assignments in the TDMA communication frame for each of the connected and yet to be connected terminals 102-1 through 102-N. Each burst assignment can include a starting slot number and a length of number of slots. In the TDMA scheme, the terminals 102 can share the same channel frequency bandwidth. Typically, the amount of bandwidth allocated and the corresponding burst assignments are updated frequently and often for each frame. The assignments are typically required to be performed very quickly, for example, so new burst assignments can be sent and reach terminals in time to be used in the next frame.

Timing synchronization is an important aspect of system 100. However, timing synchronization can be challenging because the IGM 116 may be responsible for tracking each of dozens, hundreds, or even thousands of different devices that are concurrently active and communicating using the satellite architecture. To illustrate this scenario, system 100 illustrates the inroute subsystem managing and tracking timing information for each of the terminals 102.

In particular, system 100 illustrates that the terminals 102 can communicate to the gateway 110 using the TDMA data structure 106. The TDMA data structure 106 is composed of a set number of N frames. Frames correspond to a standard unit of time period for distributing bandwidth in distinct time slots among the terminals 102. For example, the duration of one frame is fixed to 45 milliseconds (ms) and each frame is divided into an integral number of slots. Each slot can be a length of 120 symbols. However, the IGM 116 can dictate the length of each frame and the integral number of slots that compose each frame.

As mentioned, the IGM 116 can designate that each slot has a length of 120 symbols. In one example, a collection of eight frames creates what is known as a Superframe. The burst length in symbols for any given terminal can be calculated by multiplying the number of slots by 120. The number of symbols in a frame and the number of slots in the frame can also change. For example, table 1 illustrated below shows different variations of the symbol rate (kilo-symbols per second), symbols per frame, and slots per frame.

TABLE 1

Symbol Rate, Symbols/Frame and Slots/Frame Information

| Symbol Rate (Ksps) | Symbols/Frame | Slots/Frame |
|---|---|---|
| 512 | 23040 | 192 |
| 1024 | 46080 | 384 |
| 2048 | 92160 | 768 |
| 6144 | 276480 | 2304 |
| 8192 | 368640 | 3072 |
| 12288 | 552960 | 4608 |

As illustrated in system 100, the TDMA data structure 106 illustrates Frames 1 through N. Within Frame 1, the terminals 102 can insert terminal bursts into their allocated burst assignments, as designated by the IGM 116. In some cases, a terminal can be assigned multiple bursts within the same frame. In other cases, a terminal can be assigned multiple bursts across multiple frames. A frame, such as Frame 1, can be divided into slots, where each slot has a length of 120 symbols. However, the number of slots within a frame varies based on the symbol rate, as illustrated in table 1 shown above. For example, a frame can have 192 slots, 384 slots, 768 slots, and so on, based on the designated symbol rate. Additionally, a terminal burst can span multiple slots in a Frame. For example, a terminal burst can span over one, two, ten, or twenty slots in a frame.

The terminal burst can consist of various data types that the terminals 102 plan to send to the gateway 110. For example, the terminal burst can include payload data, such as video media, audio, and image data. The terminal burst can also include control information such as unique words and pilot data. The terminal burst can also include a radio ramp up and a radio ramp down, which both correspond to time delays where no information is sent and these time delays instruct the gateway 110 when to turn on and off its radio. The terminals 102 can also insert buffer periods at the forefront of each terminal burst, which will exist between subsequent terminal bursts. As will be further described below, the payload data and the control information can be included in the terminal burst and inserted into a terminal's burst allocation, as indicated by the IGM 116.

The IGM 116 can provide each terminal a Burst Allocation Packet (BAP) that indicates to the terminal which allocated burst assignment the terminal has to transmit. As mentioned above, the burst assignment may indicate to the terminal multiple bursts within the same frame or multiple bursts across multiple frames. Additionally, the IGM 116 can provide a Burst Time Plan (BTP) to the IDM 114 for each of the terminals, so the IDM 114 can track when a terminal burst is expected to be received. The BAPs and the BTPs are important features for maintaining timing synchronization of system 100. For example, the BAP can include a list of terminal ID, a starting location, and corresponding length in a triplet scheme. The BTP can include a list of starting location, aperture window size, and corresponding length in a triplet scheme. In particular, timing synchronization can be maintained as long as the terminal bursts arrive at the gateway 110 at the specified times as submitted by the BTPs to the IDM 114.

However, as mentioned, timing synchronization can be disrupted between the terminals 102 and the gateway 110 due to the variability in the movement 109 of satellite 108. The motion 109 of satellite 108 (in its predictable motion) can cause a variability in the arrival time of the terminal burst for each of the terminals 102 at the gateway 110. Additionally, other timing issues may cause a delay in the arrival of terminal bursts, such as time jitter or oscillations at the clock in each of the terminals and at a receiver of the IDM 114. Due to these timing uncertainties, the gateway 110 can use a small window of time to identify a unique word within the terminal burst. The small window of time is known as the aperture.

During the time identified by the aperture, the gateway 110 expects terminal bursts to arrive from a particular terminal, e.g., terminal 102-1, in its designated and allocated burst assignments. In particular, the IDM 114 receives a terminal burst, and within the time duration identified by the aperture, the IDM 114 identifies the unique word found within the terminal burst to detect the terminal burst. The IDM 114 can measure any timing information delay in response to identifying the unique word found within the terminal burst. As mentioned, the timing delay information can include, for example, the timing delay due to the motion 109 of satellite 108, timing delay caused by clock offsets at the terminals 102, and timing delay caused by receiver jitter at the IDM 114. The IDM 114 can then generate or resize an aperture window for a particular terminal using the measured delay from the terminal burst.

In some implementations, the IDM 114 can resize or adjust an aperture window for each of the terminals 102. By utilizing variable aperture sizes instead of one fixed aperture size for each of the terminals, the system 100 can reduce the overall bandwidth required for the burst overhead and, hence, increase bandwidth utilization. Moreover, the variable aperture sizes increase the channel throughput or bandwidth (bits/Hz) by a significant amount especially for higher symbol rates. For example, the IDM 114 can generate different aperture sizes for different terminals, and those apertures can vary for a particular terminal from frame to frame. Thus, the IDM 114 has the versatility to generate and track different apertures for the same terminal (across different frames) and for different terminals.

If the system 100 uses a fixed aperture size, e.g., time duration, for all terminals 102, the system 100 will incur reduced bandwidth utilization, especially for higher symbol rate channels. For example, assume the aperture size corresponds to a length of 30 microseconds. The aperture size in symbols can by determined by multiplying the channel transmit rate by the aperture size in time. In a 12 megasamples per-second (Msps) throughput system, the aperture size in symbols can be determined by multiplying the 12 Msps by 30 microseconds, which results in 360 symbols. Similarly, when the aperture size is 10 microseconds, and in a 10 Msps throughput system, the aperture size in symbols can be determined by multiplying the 12 Msps by 10 microseconds, which results in 120 symbols. This leads to decreased bandwidth (bits/Hz) utilization for higher symbols rates in comparison to lower symbol rates because more symbols can be transmitted in high symbol rate channels.

In practice, a majority of the terminals 102 have small timing offsets relative to the aperture size and there is significant wastage of bandwidth due to fixed overhead in the terminal burst. For example, a terminal can transmit more data in a high-speed channel when a smaller aperture window is used. However, the terminal is unable to provide any other data except for the starting portion of the terminal burst (e.g., overhead and unique word, which is expected for detection by the IDM 114). The greater the size of the aperture window, the more overhead the terminal will have to insert in the terminal burst because the terminal is unable to transmit payload data during the time duration indicated by the aperture window.

In some implementations, a goal of the IDM 114 is for the start of the unique word, e.g., the last symbol of the unique word, to land in the center of the aperture window. In other implementations, a goal of the IDM 114 is for the center of the aperture window to land on a boundary between two separate slots. The terminal needs to adjust the overhead in the terminal burst (add more or less symbols) to meet these implementations. Thus, in the case of a larger aperture window, the terminal needs to add more symbols to the overhead. In the alternative, with smaller aperture windows, the terminal can reduce the number of symbols added to the overhead. Naturally, if the terminal shrinks the buffer period, then the terminal can allocate more to the payload of the subsequent terminal burst.

However, in the case in which the gateway 110 employs a fixed aperture window scheme for all terminals, bandwidth may be inefficiently utilized in high data rate schemes. Some terminals may not require as much bandwidth for transmitting their terminal burst, but may have to insert more overhead into the terminal burst to meet the fixed aperture window scheme so the aperture window either lands at the end of the unique word or on a slot boundary. Thus, by dynamically reducing the aperture size for each terminal, the system 100 can employ higher bandwidth utilization for each throughput.

During stage (A), the terminals 102 each generate a terminal burst to insert into their allotted burst assignments. For example, user 104-1 may request for video streaming from the gateway 110 to watch on his client device. In this example, the terminal 102-1 can generate a terminal burst to insert in one or more slots of its designated burst allocation 1 ($BA_1$). For example, the system 100 illustrates two $BA_1$ for terminal 1. User 104-2 may wish to transmit video through video calling with his client device to another user connected through the internet 113 via the gateway 110. The terminal 102-2 can generate a terminal burst to insert in its designated burst allocation shown in Frame 1, designated as burst allocation 2 (BA$_2$). For example, the system 100 illustrates two BA$_2$ for terminal 2. Lastly, user 104-N may wish to transmit audio voice recording with his client device to another user connected through the internet 113 via the gateway 110. Thus, the terminal 102-N can generate a terminal burst to insert in its designated burst allocation shown in Frame 1, designated as burst allocation N (BAN). For example, the system 100 illustrates two BAN for terminal N.

In some implementations, the terminals 102 can insert their respective terminal bursts in each of the designated burst allocations in other frames shown in the TDMA data structure 106. Terminal 102-1 may be designated 10 burst allocations in Frame 1, 20 allocations in Frame 2, and 30 burst allocations in Frame 3, to name a few examples. In other examples, terminal 102-1 may be designated 10 burst allocations that span across Frame 1 and Frame 2, 20 allocations that span across Frame 2 and Frame 3, and 30 burst allocations that span across Frame 3 and Frame 4. Other examples and combinations of burst allocations across one or more Frames are also possible. However, as further described below, the terminal can adjust the overhead size between each burst in response to receiving timing correction information from the gateway 110.

During stage (B), the terminals 102 can transmit the TDMA data structure 106 to the gateway 110 through the satellite 108. In particular, each terminal can transmit the terminal burst at its time indicated by the designated burst allocation to the gateway 110. The terminals 102 can modulate the terminal burst using a particular modulation scheme, e.g., BPSK, FSK, QPSK, QAM, and transmit the terminal burst at the desired transmit frequency. Given that the terminals 102 are transmitting in the TDMA scheme, each terminal can transmit at a different time on the same frequency. In some implementations, the IGM 116 can designate the modulation scheme and the transmit frequency to each of the terminals 102. Each terminal can use a different modulation scheme for the terminal burst but they will each transmit on the same transmit frequency.

As each terminal burst travels from the terminal to the satellite 108 and from the satellite 108 to the gateway 110, the IDM 114 may receive each terminal burst at a time different from its expected arrival time. The reasons for the delay, as mentioned above, can be illustrated in system 100 as the variability in the motion 109 of the satellite 108. The satellite 108 may move, for example, in a predictable pattern around the Earth, which can cause delays in transmission and reception. Because the motion of the satellite is predictable and controlled, the size of the uncertainty in the aperture window can be determined. Additionally, the satellite can alter the angle of its reflective plates or panels, which also may add to the time delay incurred by the terminal burst.

During stage (C), the IDM 114 receives the TDMA data structure 106 from each of the terminals 102. In some implementations, the IDM 114 may receive one frame at a time or one burst at a time from the terminals 102. In response to receiving the TDMA data structure 106, the IDM 114 can perform one or more functions to detect a terminal burst from the TDMA data structure 106. For example, the IDM 114 can retrieve an aperture window from an aperture database and perform a correlation against a portion of the TDMA data structure 106 during a time window identified by the aperture window.

In some implementations, the IDM 114 performs a correlation by searching for the unique word in the terminal burst. The IDM 114 can designate to each terminal 102 a unique word to be inserted in their terminal burst. The unique word can be unique to that particular terminal. In other examples, each particular terminal can have the same unique word. Thus, when the IDM 114 receives a terminal burst and identifies which terminal the terminal burst came from by way of the BTP, e.g., indicating when a terminal burst for a particular terminal is expected to be received, the IDM 114 can retrieve the corresponding unique word for that terminal. The IDM 114 then performs a correlation or some other comparison function to find that corresponding unique word in the terminal burst.

In response to performing the comparison function, the IDM 114 can determine the timing offset associated with that particular terminal. This process will be further defined below. In response, the IDM 114 can pass the timing offset information to the IGM 116. The IGM 116 can use the timing offset information to generate or adjust an aperture window for that particular terminal. The IDM 114 can generate a timing offset for each terminal.

As illustrated in the example of system 100, the IGM 116 generates an aperture window of 20 microseconds for terminal 102-1, e.g., [$t_0$−10, $t_0$+10], an aperture window of 18 microseconds for terminal 102-2, e.g., [$t_0$−9, $t_0$+9], and an aperture window of 12 microseconds for terminal 102-N, e.g., [$t_0$−6, $t_0$+6]. Other aperture window sizes are also possible. In the examples of aperture windows, $t_0$ can correspond to a time of subsequent transmission of a terminal burst for a particular terminal. Thus, the aperture window can represent the uncertainty in the timing delay between the terminal, the satellite, and the gateway.

During stage (D), in response to generating or adjusting an aperture window for the particular terminal, the IGM 116 can transmit the timing correction information to the corresponding terminal. In some implementations, the IGM 116 can transmit separate timing correction information to corresponding terminals. The timing correction information can include, for example, the timing offset information determined by the IDM 114 and instructions to adjust the overhead amount in subsequent terminal bursts based on the determined timing offset information. Additionally, the IGM 116 can transmit the BAP for the particular terminal to indicate to the terminal which allocated burst assignment to use for subsequent terminal burst transmissions.

As illustrated in system 100, the IGM 116 can transmit the timing information to the corresponding terminal 102-1 through satellite 108. The IGM 116 can also transmit corresponding timing information to other terminals 102-2 through 102-N. The terminals 102 can receive the timing information and adjust the overhead to be used with the terminal bursts for subsequent transmissions. Additionally, the terminals 102 can receive their corresponding BAPs from the IGM 116 to know the allotted burst assignment to transmit subsequent terminal bursts.

In some implementations, before transmitting, the IGM 116 can store the determined timing offset information for each terminal in memory for tracking purposes. For example, the IGM 116 can store the newly adjusted aperture window, the previously used aperture window, the determined timing offset for the terminal, and data identifying the terminal. Data identifying the terminal can include a terminal number, an IP/MAC address, and other identifier information.

Figure 1B:
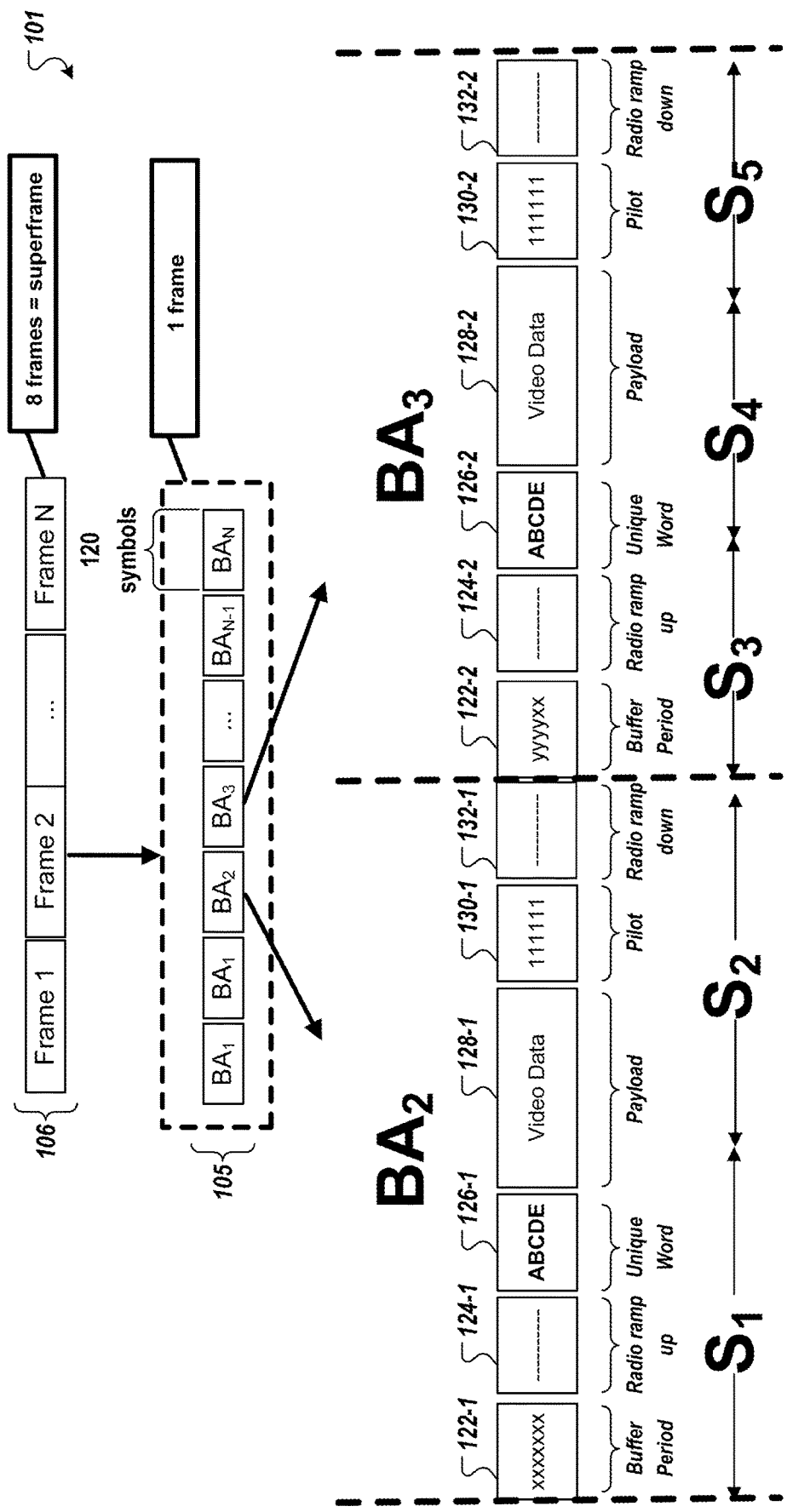
FIG. 1B is a block diagram that illustrates an example of a structure in a TDMA system.

FIG. 1B is a block diagram that illustrates an example of a structure in a TDMA system 101. In particular, the system 101 illustrates the TDMA data structure 106 from system 100. The TDMA data structure 106 includes N frames connected together in time. For example, the TDMA data structure 106 can include 512, 1024, 2048, or more frames. Eight frames in the TDMA data structure 106 corresponds to one Superframe. In some examples, each frame can be set to a designated time length, such as 45 milliseconds.

As illustrated in system 100, and illustrated here in system 101, each frame can be subdivided into an integral number of slots. In this particular example of system 101, the frame 105 can be shown to have N burst allocations—some designated for terminal 1, e.g., allocation $BA_1$, some designated for terminal 2, e.g., allocation $BA_2$, and some designated for other terminals, all the way up to N, e.g., allocation BAN. Additionally, as previously mentioned, each burst allocation can include one or more slots, and the number of slots can be dictated by the symbol rate of transmission associated with each terminal. For example, $BA_2$ includes two slots, e.g., slot 1 and slot 2. $BA_3$ includes three slots, e.g., slot 3, slot 4, and slot 5. A burst allocation can include more than or less than the number of slots illustrated in system 101. Each slot may include a length of 120 symbols. In some cases, a time slot can refer to the particular slot in a burst assignment where a terminal burst initiates. As indicated in system 101, the slot 1 may be referred to as a time slot.

The TDMA system 101 also illustrates the composition make-up of each allocation. For example, system 101 illustrates the composition make-up of allocation 2 and the composition make-up of allocation 3. In allocation 2, terminal 2 has generated and inserted its terminal burst. In allocation 3, terminal 3 has generated and inserted its terminal burst. The terminal burst in allocation 2 can include the following: radio ramp up 124-1, unique word 126-1, payload data 128-1, pilot symbols 130-1, and radio ramp down 132-1. The terminal burst in allocation 3 can include the following: radio ramp up 124-2, unique word 126-2, payload 128-2, pilot symbols 130-1, and radio ramp down 132-2. The buffer periods 122-1 and 122-2 are inserted at the forefront of each terminal burst.

The buffer periods 122-1 and 122-2 (collectively "122") or overhead 122 can include symbols inserted by the terminals to adjust for the aperture size generated by the IDM 114. For example, the terminals can insert different buffer periods or overhead sizes to account for the size of the aperture window. As previously mentioned, the buffer periods 122 are larger for larger aperture sizes and smaller for smaller aperture sizes. The buffer periods 122 are filled to a size such that the IDM 114's aperture window falls on the center of a slot boundary, e.g., in between two slots, or at the center of the unique word of the terminal burst. In some cases, the greater the buffer period inserted by the terminal, the greater number of slots that will be included within a burst assignment as the size of a slot is a fixed length, e.g., 120 symbols.

The radio ramp up 124-1 and 124-2 (collectively "radio ramp up 124") can correspond to a delay or a period of time inserted by the terminals to indicate to the IDM 114 to begin searching for the unique word within the terminal burst. The radio ramp up 124 can be positioned after the buffer period 122 and before the unique word in the terminal burst. In some cases, a receiver of the IDM 114 can operate in a low power mode, and when the receiver detects the time period identified by the radio ramp up 124, the receiver switches to a normal power mode, e.g., a higher power mode than the low power mode, and continues to search for the unique word in the terminal burst.

The unique word 126-1 and 126-2 (collectively "unique word 126") can include symbols designated by the IDM 114 for identifying and detecting the terminal burst from a particular terminal. The IDM 114 can designate each terminal with a particular unique word that is unique to that terminal. The unique word 126 can be, for example, a hexadecimal value, a plaintext word, or some other bit/byte representation. The unique word 126 can be a long string of symbols in a particular pattern that is transmitted from the terminal so the receiver, e.g., IDM 114, can find it.

The IDM 114 can continuously try to correlate and identify the pattern in the unique word. The unique word 126 can be positioned in the terminal burst after the radio ramp up 124 and before the payload data. In some examples, the unique word can use a different modulation scheme than the modulation scheme pertaining to the payload. For example, the unique word modulation can include BPSK, FSK, QPSK, etc. In some implementations, not all of the symbols in the unique word 126 need to be included within the aperture for the receiver to detect the corresponding terminal burst. In some instances, only a portion of the unique word 126, such as the last 10 symbols, need to be included in the aperture window for detection of a corresponding terminal burst.

The payload data 128-1 and 128-2 (collectively "payload 128") can include data provided by one or more of the client devices connected to that particular terminal. For example, the data can include video data, audio data, text data, and photograph data that the one or more client devices connected to the particular terminal requests from the internet 113 or transmits to the internet 113. The payload data 128 can be a field that includes the largest number of symbols within the terminal burst. Additionally, the payload data 128 can extend between allocations from the same terminal. The payload data 128 can also extend between different allocations across various frames, in some examples. The payload data 128 can be positioned in the terminal burst after the unique word and before the pilot symbols.

The pilot symbols 130-1 and 130-2 (collectively "pilot symbols 130") can include symbols transmitted in the terminal burst for supervisory, control, equalization, continuity, synchronization, or reference purposes. The IDM 114 can instruct the terminals 102 to insert the pilot symbols 130 after the payload data 128. The pilot symbols 130 may also be used to determine the channel estimation and ultimately, help the IDM 114 obtain a better Bit Error Rate (BER) when receiving and processing the terminal burst. The pilot symbols 130 can be positioned in the terminal burst after the payload data 128 and before the ramp down.

The radio ramp down 132-1 and 132-2 (collectively "radio ramp down 132") can correspond to a delay or a period of time inserted by the terminal to indicate to the IDM 114 to stop searching for the unique word within the terminal burst. The radio ramp down 132 can be positioned after the pilot symbols 130 in the terminal burst. In some cases, after the IDM 114 has detected the time period identified by the the radio ramp down 132, the receiver of the IDM 114 can switch back to the low power mode, where the receiver actively searches for a time period identified by the radio ramp up 124 of a subsequent terminal burst in the low power mode.

The radio ramp up 124, unique word 126, pilot symbols 130, and the radio ramp down 132 form the burst overhead within the terminal burst's allocation. The buffer period 122 is positioned in front of each terminal burst. The aperture also forms a portion of the burst overhead, which will be further discussed below.

Figure 1C:
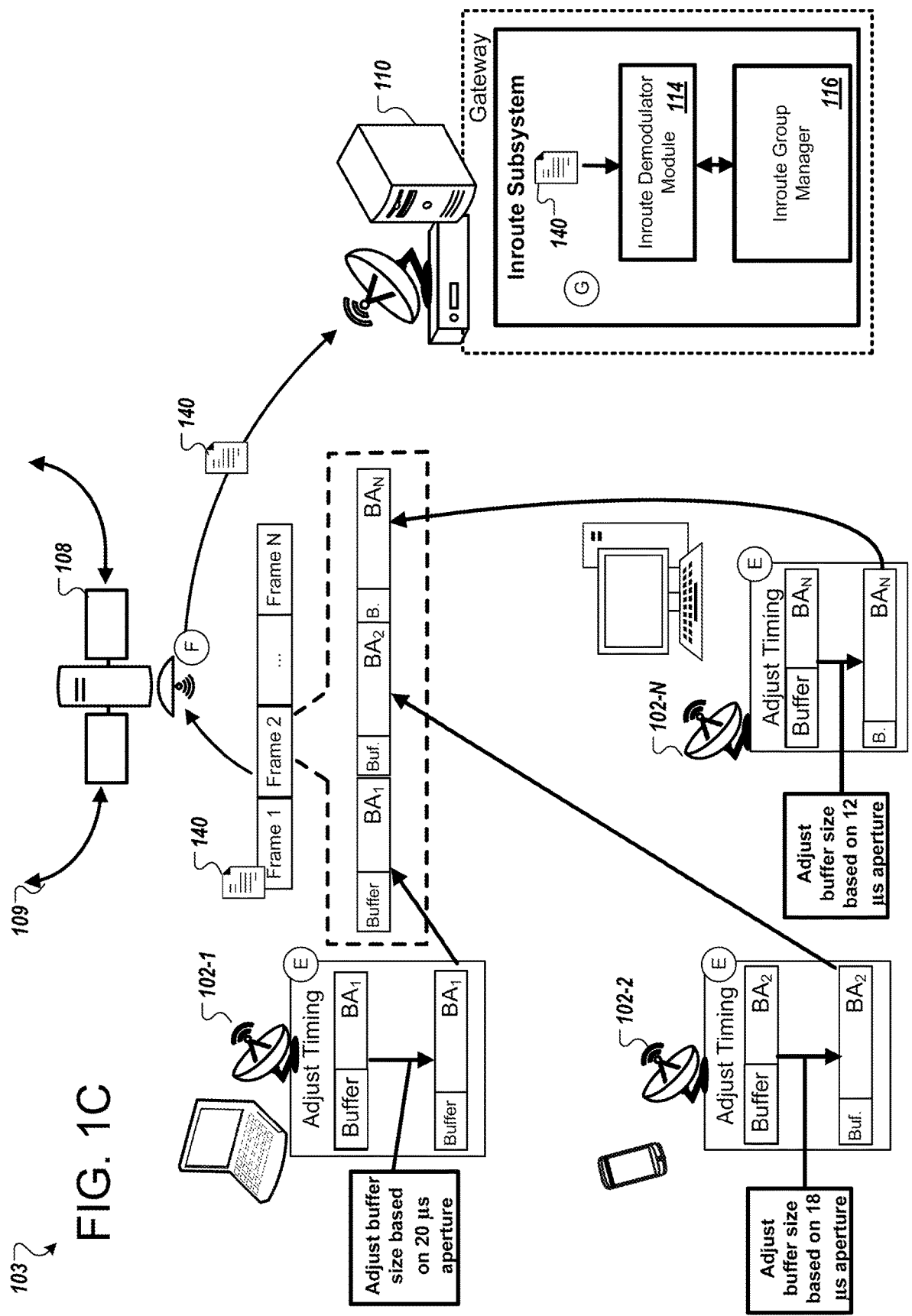
FIG. 1C is another block diagram that illustrates an example of a system for adjusting a size of an aperture window using timing information.

FIG. 1C is another block diagram that illustrates an example of a system 103 for adjusting a size of an aperture window using timing information. In some implementations, system 103 is a continuation of the stages that occurred in system 100. FIG. 1C illustrates various operations in stages (E) through (G) which can be performed in the sequence indicated or in another sequence.

During stage (E), each of the terminals 102 have received their corresponding timing offset information from the IGM 116. In response to receiving the timing offset information, the terminals 102 adjust their buffer period or overhead size, correspondingly. As illustrated in the example of system 103, the terminal 102-1 shrinks its buffer period size for subsequent terminal burst transmissions based on the 20 microseconds aperture window generated by the IGM 116. Likewise, the terminal 102-2 shrinks its buffer period size for subsequent terminal burst transmissions based on the 18 microseconds aperture window generated by the IGM 116. Additionally, the terminal 102-N can shrink its buffer period size for subsequent terminal burst transmissions based on the 12 microseconds aperture window generated by the IGM 116.

In some implementations, the larger the aperture window generated by the IGM 116, the larger the buffer period in the subsequent terminal bursts. For example, as illustrated in the system 103, the aperture window size of 20 microseconds generated for the terminal 102-1 corresponds to a larger buffer period size in the reduction than the other buffer period sizes for the other terminals. The smallest aperture window size of 12 microseconds generated for the terminal 102-N corresponds to the smallest buffer period size in the reduction than the other buffer period sizes for the other terminals. The terminal can transmit subsequent terminal bursts based on information provided in the BAP.

During stage (F), the terminals 102 can transmit the TDMA data structure 140 to the gateway 110 through the satellite 108. Stage (F) is similar to stage (B) from system 100 in that each terminal can transmit its corresponding terminal burst at its designated and allotted burst allocation to the gateway 110. However, as illustrated in system 103, the different allocations, e.g., BA$_1$, BA$_2$, and BAN, include the new buffer period adjustments at the front of each respective allocation. These allocations are ultimately included with frame 2 of the TDMA data structure 140. However, given that the terminals can transmit at earlier and later allocation times as indicated by the IGM 116, the terminal bursts for each of the terminals 102 can have similar buffer period reduction sizes to those illustrated here. After transmitting each terminal burst at their respective burst allocation times, the TDMA data structure 140 is sent to the satellite 108, which subsequently transmits the TDMA data structure 140 to the gateway 110.

During stage (G), the IDM 114 receives the TDMA data structure 140 from each of the terminals 102. Stage (G) is similar to stage (C) from system 100. However, in stage (G), in response to the IDM 114 receiving the TDMA data structure 140 from each of the terminals 102, the IDM 114 can retrieve a BTP to determine which terminal burst is expected to be received. Then, the IDM 114 can retrieve the corresponding newly generated aperture window from the aperture database, e.g., generated during stage (C) of system 100, for the corresponding received terminal burst. The IDM 114 can then perform a comparison, such as a correlation, to detect the expected particular terminal burst from the TDMA data structure 140. The IDM 114 can perform this process for each of the terminal bursts received in the TDMA data structure 140.

In some implementations, the IDM 114 uses the new aperture window for a particular terminal for the next preconfigured amount of frames. The preconfigured amount of frames can be a set number defined by a designer of systems 100 and 103. For example, the designer may set the preconfigured amount of frames to be 100 or 1000. In this example, for terminal 102-1, the IDM 114 can process terminal bursts received from terminal 102-1 using the aperture window of 20 microseconds or [$t_0-10$, $t_0+10$] for the next 100 or 1000 frames, where to corresponds to the transmission time of subsequent terminal burst transmission by the terminal 102-1.

In response to the IDM 114 receiving the 101$^{st}$ frame, the IDM 114 can revert the aperture window to use a normal aperture size again instead of the adjusted aperture window. The normal aperture size can correspond to an aperture window size of 30 microseconds, for example. Other window sizes are also possible for the normal aperture window size. After using the normal aperture window size for the 101$^{st}$ frame, the IDM 114 and the IGM 116 can determine a new timing offset, a new reduced aperture window size based on the new timing offset, and use the new reduced or short aperture window size for the next preconfigured amount of frames. This process repeats to maintain track of any changes or time shifts between the terminals 102 and the gateway 110.

Figure 2A:
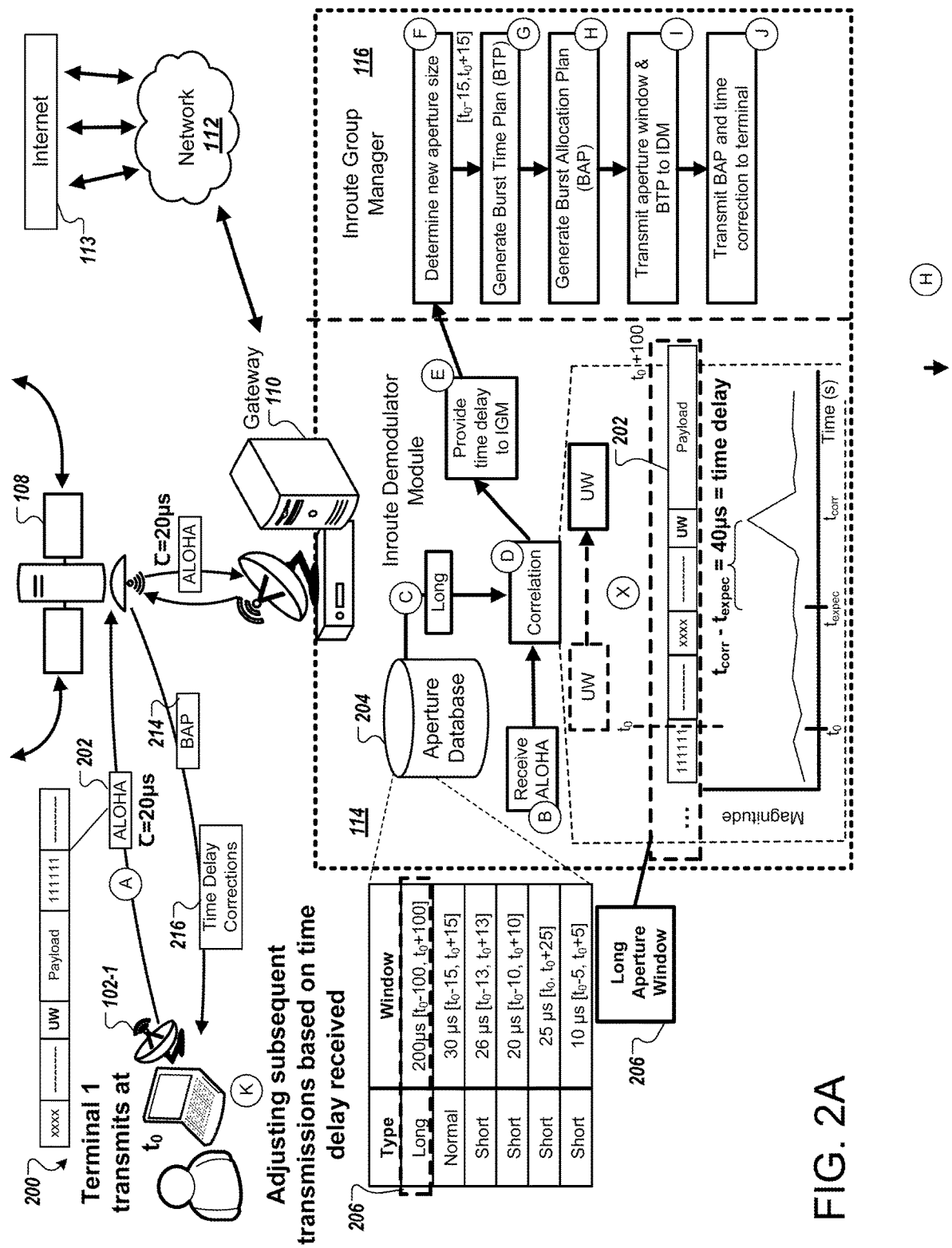
FIG. 2A is a block diagram that illustrates an example of a system for adjusting a size of an aperture window when a terminal connects to a gateway.

FIG. 2A is a block diagram that illustrates an example of a system 200 for adjusting a size of an aperture window when a terminal connects to a gateway. In system 200, when a terminal is first commissioned or when the terminal returns back online after being down or off, the terminal is unaware of its timing offset with respect to the gateway. Thus, in order to determine the timing offset between the two devices, the gateway uses a larger aperture to find the timing offset, and reduces the larger aperture to a smaller aperture for subsequent terminal burst transmissions. FIG. 2A illustrates various operations in stages (A) through (L) which can be performed in the sequence indicated or in another sequence.

System 200 illustrates similar components to system 100, such as, for example, terminal 102-1, satellite 108, gateway 110, IDM 114, and IGM 116. However, the system 200 also illustrates additional components within the gateway 110 which will be further described below. For example, the IDM 114 also includes an aperture database 204. The aperture database 204 includes various aperture windows, e.g., long, normal, and short windows, each used for different purposes when acquiring and detecting the terminal burst from each transmit.

The gateway can apply long aperture windows for terminals first coming online to time synchronize with the gateway. Normal aperture windows can be used for terminals that are currently in a steady state of transmission with the gateway. The normal aperture can also be used by the gateway as an aperture window between adjustments of small aperture windows. Lastly, the small aperture windows can correspond to the aperture windows that were dynamically resized from the normal aperture window for each particular terminal. For example, terminal 102-1 may utilize the short aperture window of 20 microseconds and terminal 102-2 may utilize the short aperture window of 25 microseconds.

Additionally, the IDM 114 can include a correlation function that identifies the timing offset for the particular terminal. The correlation function can identify the timing offset for the particular terminal with the time of transmission of a terminal burst, e.g., $t_0$, an expected time for identifying the end of the unique word, e.g., $t_{expec}$, and the actual time the end of the unique word was found, e.g., $t_{corr}$.

The to can correspond to the time identified in the BAP provided to the terminal. The $t_{expec}$ can correspond to the amount of time from the start of the buffer period in the unique word to the end of the unique word. For example, in the terminal burst, the length of time of the buffer period can include 4 microseconds, the length of time of the radio ramp up can include 6 microseconds, and the length of time of the unique word can include 5 microseconds. Thus, the $t_{expec}$ can correspond to the time of $t_0$ plus 15 microseconds. Other times for $t_{expec}$ can also be calculated based on the differing lengths of time of the buffer period, radio ramp up, and the unique word.

During stage (A), the terminal 102-1 has been commissioned and seeks to connect to the gateway 110. Thus, the terminal 102-1 transmits a Bootstrap ALOHA 202 to the gateway 110 through the satellite 108. The Bootstrap ALOHA 202 may be a terminal burst that indicates to the gateway 110 that a terminal seeks to connect, setup, and/or time synchronize to the gateway 110. Additionally, the Bootstrap ALOHA 202 can have a similar terminal burst format to that indicated by the terminal burst format indicated in system 101. However, the payload of the Bootstrap ALOHA 202 may be left blank or indicate a request to connect to the gateway 110.

Thus, as illustrated in the example of system 200, the Bootstrap ALOHA 202 includes a buffer period, a radio ramp up, a unique word, a payload, pilot symbols, and a radio ramp down. As the terminal 102-1 transmits the Bootstrap ALOHA 202 to the gateway 110 through the satellite 108, a delay of 20 microseconds is incurred on the reception of the Bootstrap ALOHA 202. The delay of 20 microseconds, or some other amount, can be caused by an inaccurate time reference at the transmitter of the terminal 102-1. Additionally, the movement, position, and angle of the satellite 108 can also cause the delay on the reception of the Bootstrap ALOHA 202.

The satellite 108 can then transmit the Bootstrap ALOHA 202 to the gateway 110. Additionally delays may be incurred as the Bootstrap ALOHA 202 travels between the satellite 108 and the gateway 110. For example, the delay can include an additional delay of 20 microseconds. Therefore, when the IDM 114 receives the Bootstrap ALOHA 202, the IDM 114 should identify at least a delay of 40 microseconds in its reception.

During stage (B), the IDM 114 receives the Bootstrap ALOHA 202 from the terminal 102-1. The IDM 114 may determine that this does not correspond to an expected message because this Bootstrap ALOHA 202 was received outside any time identified through any of the BTPs, e.g., identifiers indicating when a terminal burst is expected to be received from a particular terminal. As a result, the IDM 114 can determine that this Bootstrap ALOHA 202 must have come from a terminal seeking to time synchronize.

During stage (C), the IDM 114 can retrieve a long aperture window from the aperture database 204. The IDM 114 can identify a longer aperture window and its corresponding time characteristics. For example, the IDM 114 can retrieve a long aperture window of 200 microseconds or $[t_0-100, t_0+100]$ and estimate a value of $t_0$. The IDM 114 may estimate the time at which the terminal seeking to connect transmitted the Bootstrap ALOHA 202 by subtracting a typical transmission time from the time the Bootstrap ALOHA 202 was received. The IDM 114 can analyze other data, such as typical transmission times illustrated by other terminals currently in a steady state (e.g., using normal or short apertures), to identify the estimated transmit time of $t_0$.

In some implementations, the IDM 114 can determine an aperture open symbol to determine where the unique word can begin in a terminal burst. For example, the IDM 114 can calculate the aperture open symbol from the start of a Superframe (SOSF). The IDM 114 can use the calculated aperture open symbol to determine where to start searching for the unique word of a burst. For example, the IDM 114 can calculate the aperture open symbol using the following equation:

$$\text{Aperture Open Symbol} = \\ (\text{Number of Symbols in Frame} * \text{Frame number}) + \\ (\text{Start Slot Number} + 1) * \\ \left(\frac{\text{Number of Symbols}}{\text{Slot}}\right) - \left(\frac{\text{Aperture Length in Symbols}}{2}\right) - \\ \text{Unique Word Symbol Length} + 9 \quad \text{Equation 1}$$

In equation 1, the "Number of Symbols in Frame" can be determined from Table 1—Symbol Rate, Symbols/Frame and Slots/Frame Information. The "Frame Number" is the relative frame number from the start of the Superframe. Thus, the "Frame Number" can range from 0 to 7. The "Start Slot Number" corresponds to the slot number within a particular frame in which the IGM 116 has allocated to the particular terminal from which to start transmitting the terminal burst. The "Number of Symbols/Slot" corresponds to a fixed number—in this particular example, the number of symbols per slot can be fixed to 120 symbols. The "Aperture Length in Symbols" can be calculated based on the symbol rate of the terminal burst. The Aperture length in time can correspond to a fixed time length of 30 microseconds, for example. The "Unique Word Symbol Length" corresponds to a fixed symbol length, such as 40 symbols. Lastly, the extra 9 symbols added to the "Unique Word Symbol Length" accounts for the group delay in the transmission due to the overall design of the IDM 114.

During stage (D), after the IDM 114 has calculated the estimated transmit time of $t_0$, the IDM 114 can provide the long aperture window 206 to its correlation module. In the correlation module, the IDM 114 can perform a correlation on a portion of the Bootstrap ALOHA 202 identified by the long aperture window 206. In some implementations, the IDM 114 can retrieve a unique word from memory or a database that the terminals 102 insert in their terminal burst when transmitting a Bootstrap ALOHA 202. The terminals 102 and the gateway 110 can save in memory this particular unique word. For example, the unique word can be "ALOHA," in symbol form that each terminal inserts into the terminal burst when time syncing with the gateway 110.

In response to identifying the unique word and the long aperture window 206, the IDM 114 can perform the correlation. In particular, the IDM 114 can apply the long aperture window to the portion of the Bootstrap ALOHA 202. For example, the IDM 114 can identify that to for the terminal seeking to connect is at a particular time and the 200 microseconds around at the particular time corresponds to the long aperture window. Additionally, the IDM 114 can determine an expected time to identify the end of the unique word, e.g., $t_{expec}$, by adding the length in time of the buffer period, the radio ramp up, and the unique word to the time the Bootstrap ALOHA 202 is expected to be received.

Typically, when the requesting terminal transmits a Bootstrap ALOHA 202, the terminal will insert a buffer period of a predetermined size, such as 10 symbols, for example. Both the terminals 102 and the gateway 110 store and track a length of the predetermined size. In this manner, the gateway 110 (and more specifically the IDM 114) can accurately determine the $t_{expec}$ by adding the length in time of the predetermined buffer period size, the length in time of the radio ramp up, and the length in time of the unique word. By knowing the transmission time to and the expected time to identify the end of the unique word $t_{expec}$, then the timing offset can be determined.

In some implementations, the IDM 114 performs a correlation between the extracted unique word against the portion of the Bootstrap ALOHA 202. In particular, and as illustrated in system 100, the IDM 114 performs the correlation by sliding the extracted unique word across the portion of the Bootstrap ALOHA 202 during the long aperture window and performing a dot product at each symbol or each index. By performing the correlation, the IDM 114 can identify the similarity and the location of the similarity between the unique word and the portion of the Bootstrap ALOHA 202 within the long aperture window. In some implementations, the IDM 114 can perform a convolution in which the unique word is flipped or reversed and then slide the flipped unique word across the portion of the Bootstrap ALOHA 202 during the longer aperture window and performing a dot product multiplication at each symbol.

As illustrated in the example of system 200, the result of the convolution is shown in the magnitude vs time plot within the correlation section. In particular, the transmitted time of the Bootstrap ALOHA 202 corresponds to the time at to. The expected time in which the end of the unique word is expected to be found is identified by the time at $t_{expec}$. However, because the Bootstrap ALOHA 202 message was received with a delay of 40 microseconds, the actual end of the unique word was found 40 microseconds after the expected time $t_{expec}$. For example, as shown in the plot of system 200, the magnitude of the correlation peaks at the location identified by the end of the unique word. The location of the peak corresponds to the time at which the end of the unique word was found, e.g., $t_{corr}$. After identifying the $t_{corr}$, the IDM 114 subtracts the $t_{corr}$ from the $t_{expec}$ to determine the timing offset associated with terminal 102-1. The result corresponds to 40 microseconds, which matches the delay incurred by the Bootstrap ALOHA 202 during transmission and reception.

During stage (E), in response to identifying the time delay by the correlation or convolution process, the IDM 114 provides the timing delay to the IGM 116. In some implementations, the IDM 114 can store the time delay and an identifier that identifies the terminal that transmitted the Bootstrap ALOHA 202 in memory and provide the location to the IGM 116. In some implementations, the IDM 114 can specifically provide the time delay and data that identifies the terminal, e.g., an IP address, MAC address, or other identifier, to the IGM 116. As the IDM 114 and the IGM 116 are two components of the same system, e.g., the inroute subsystem, transferring of information between these components is quick and seamless.

During stage (F), the IGM 116 receives the timing delay and information that identifies the terminal that transmitted the Bootstrap ALOHA 202. In some implementations, the IGM 116 generates a new aperture window based on the timing delay identified by the IDM 114. For example, the IGM 116 can generate a new aperture window or adjust the long aperture window to be of a normal aperture size, such as 30 microseconds, e.g., [$t_0$−15, $t_0$+15], where to corresponds to subsequent terminal burst transmissions for the corresponding terminal. This to is different from the to that was used in stage (D) with the correlation module.

During stage (G), the IGM 116 generates a Burst Time Plan (BTP) that indicates to the IDM 114 when the next subsequent terminal burst is expected to be received for the terminal 102-1. For example, the IGM 116 determines a BTP that indicates 12:02 PM as the next subsequent terminal burst to be received for terminal 102-1. The IGM 116 can determine the BTP for terminal 102-1 by accounting for a variety of factors. These factors can include a time of travel of the terminal burst, a time generated by the IGM 116 that indicates when the terminal 102-1 is to transmit subsequent terminal bursts, e.g., a burst allocation indicated by a Burst Allocation Plan, a time delay accounted for by the satellite drift, and the determined timing offset by the IDM 114.

During stage (H), the IGM 116 generates a Burst Allocation Plan (BAP) that indicates to the terminal 102-1 the burst allocation the terminal 102-1 can start transmitting subsequent terminal bursts. The IGM 116 can determine the allocated starting burst allocation for subsequent terminal bursts using the time generated during stage (G) to indicate when the terminal 102-1 is to transmit subsequent terminal bursts. The IGM 116 may identify slots that have not yet been filled in future frames and identify those slots as locations for transmission of subsequent terminal bursts for terminal 102-1. The BAP may correspond to a particular time that designates a slot, such as 12:03 and 10 microseconds PM. For example, if a future frame has 10 slots, and each terminal has been instructed to insert a terminal burst at an interval of 100 microseconds starting at 12:00 PM, the IGM 116 can indicate to the terminal 102-1 in a BAP that it is to transmit at the interval time starting at 12:00 PM.

In some implementations, the IGM 116 can indicate a small time window around the burst allocation indicated in the BAP in which the terminal 102-1 can transmit a subsequent terminal burst. In some cases, the terminal 102-1 may have to wait for one of its connected client devices to send a request or send data for the terminal 102-1 to transmit its terminal bursts. Thus, if the terminal 102-1 is instructed to transmit at a particular burst allocation, but none of its connected client devices have sent a request or data at that time slot, then the terminal 102-1 can wait within the small time window designated by the BAP for one of the connected clients to provide data to transmit. Otherwise, if the small time window has passed, the terminal 102-1 waits for the next designated burst allocation to transmit.

During stage (I), the IGM 116 transmits the generated aperture window and the BTP to the IDM 114. The IDM 114 receives the generated aperture window and stores the generated aperture window in the aperture database 204. The IDM 114 stores an identifier and additional data that identifies the terminal 102-1 with the generated aperture window in the aperture database 204 so the IDM 114 can determine which aperture window to apply the next time the IDM 114 receives a terminal burst from terminal 102-1.

Additionally, the IDM 114 stores the BTP to determine a time in which the next subsequent terminal burst for that terminal is to be received by the IDM 114. Thus, in the next received terminal burst, the IDM 114 can identify through the BTP which terminal transmitted the terminal burst based on the time of reception and transmission, e.g., $t_0$, and extract the corresponding generated aperture window for detecting the terminal burst, e.g., by detecting an entirety of the unique word. This process occurs for the next N or preconfigured amount of frames for that particular terminal.

During stage (J), the IGM 116 generates data that instructs the particular terminal, e.g., terminal 102-1, to perform timing corrections on subsequent transmissions. For example, the data can include correction data that instructs the terminal 102-1 to shrink its buffer period or overhead by a predetermined amount for subsequent terminal burst transmissions. The correction data can indicate that the terminal 102-1 is to shrink its buffer period by 10 symbols, for example. In other examples, the correction data can indicate that the terminal is to enlarge its buffer period or overhead by 10 symbols, for example. The correction data can also include the timing delay determined by the IDM 114 and the terminal 102-1 can determine a buffer period adjustment on its own using the received timing delay from the IGM 116.

In some implementations, the correction data can include data that identifies a number of frames or symbols for the adjusted buffer period size. For example, the correction data can indicate that the terminal 102-1 is to reduce its buffer period size by 10 symbols for the next 100 frames. After the terminal 102-1 has transmitted a predefined number of frames for the adjusted buffer period size, the terminal 102-1 can return the buffer period size to a previous or standard buffer period size. In other implementations, once the terminal 102-1 has adjusted or reduced its buffer period size, the terminal 102-1 can maintain the indicated buffer period size for every subsequent transmission until the IGM 116 has provided a correction to a new buffer period size.

After generating the data that instructs the terminal 102-1 to perform timing corrections on subsequent terminal burst transmissions, the IGM 116 transmits the data and the BAP for terminal 102-1 to the terminal 102-1. The IGM 116 can transmit the data and the BAP to the terminal 102-1 through the satellite 108. In some implementations, the IGM 116 can transmit the data to the terminal 102-1 on the same frequency that the terminal 102-1 transmitted the terminal burst. In other implementations, the IGM 116 can transmit the data to the terminal 102-1 on a different frequency than the frequency transmitted for the terminal bursts. The terminal 102-1 may include separate transmitter and receiver components/functions that operate on the same or different frequencies.

As illustrated in system 200, the IGM 116 provides the BAP 214 and the timing delay corrections 216 to the terminal 102-1 over the satellite 108. In some implementations, the IGM 116 may store the time delay corrections 216 in memory first before transmitting to track the instructions sent to the terminal 102-1. For example, the IGM 116 can store the correction data along with the identified to, $t_{expec}$, and $t_{corr}$ in memory.

During stage (K), the terminal 102-1 can receive the BAP 214 and the timing delay corrections 216 from the gateway 110. The terminal 102-1 adjusts subsequent terminal bursts based on the information provided in the time delay corrections 216. For example, the timing delay corrections 216 can indicate to shrink the buffer period for subsequent terminal bursts by 10 symbols, increase the buffer period for subsequent terminal bursts by 10 symbols, or even indicate the new aperture size window generated by the IGM 116. The terminal 102-1 can use the BAP 214 to determine its burst allocation assignments for future transmission of the adjusted terminal bursts, e.g., terminal bursts with adjusted buffer periods indicated by the timing delay in the timing delay corrections 216.

If the timing delay corrections 216 indicate the new aperture size window generated by the IGM 116, the terminal 102-1 can make its own determination on how to adjust the buffer period for subsequent terminal bursts. For example, the terminal 102-1 can adjust the buffer period size proportionally to the size of the generated aperture window—the bigger the size of the aperture window, the bigger the size of the buffer period, and vice versa. Other implementations are also possible for adjusting the buffer period size of subsequent terminal bursts.

Figure 2B:
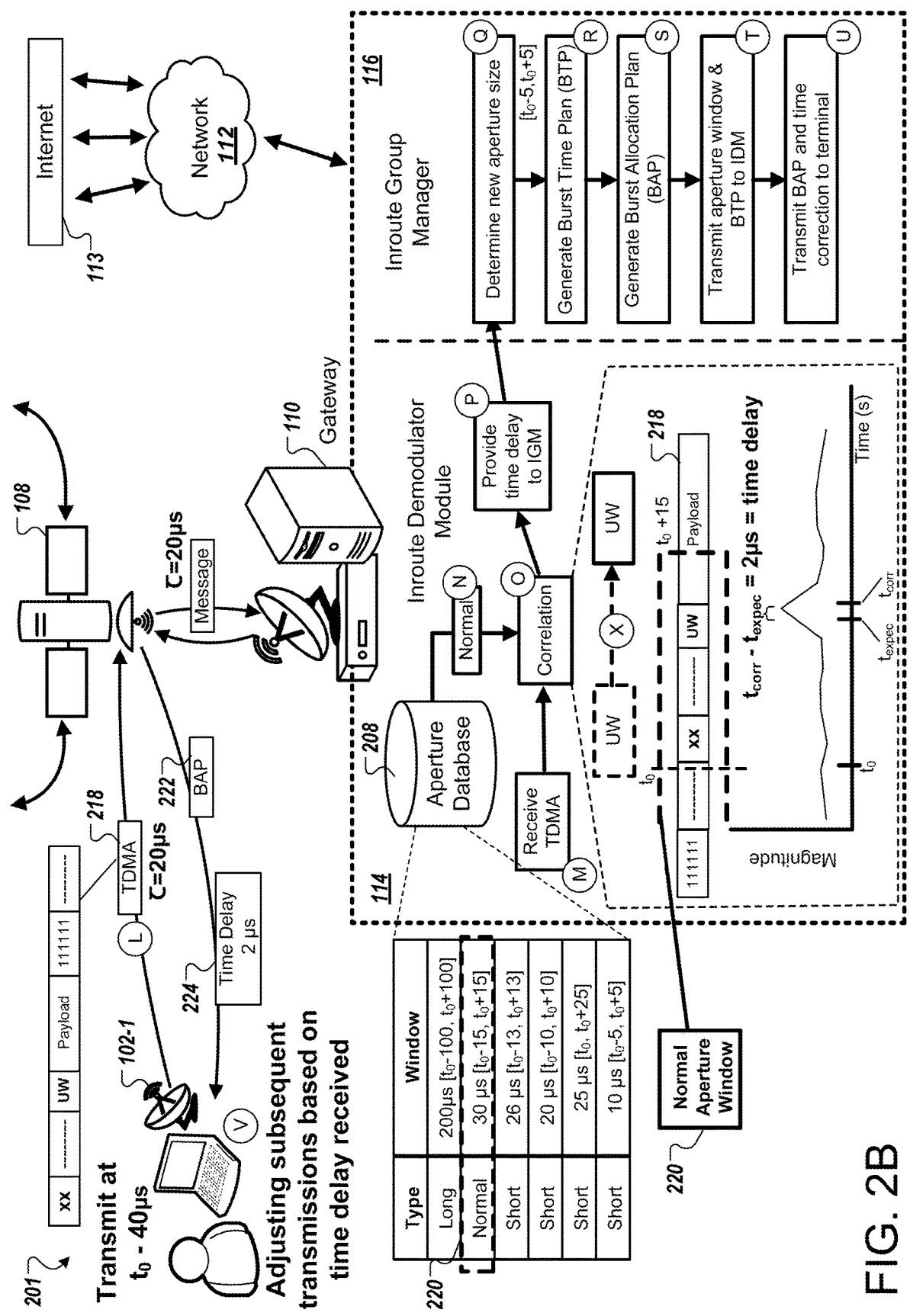
FIGS. 2B-2D are block diagrams that illustrate examples of systems for adjusting a size of an aperture window using timing information.

FIG. 2B is a block diagram that illustrates an example of a system 201 for adjusting a size of an aperture window using timing information. System 201 is a continuation of system 200. FIG. 2B illustrates various operations in stages (L) through (V) which can be performed in the sequence indicated or in another sequence.

During stage (L), after the terminal 102-1 has received the BAP 214 and the timing delay corrections 216, the terminal 102-1 generates a subsequent terminal burst with the adjusted buffer period size and inserts the terminal burst into the TDMA data structure 218 at the burst allocation assignment indicated by the BAP 214. In particular, the terminal 102-1 transmits the terminal burst starting in a slot identified by the BAP 214, e.g., at the burst allocation, and with the appropriate corrections made to the buffer period as indicated by the timing delay corrections 216. For example, and as illustrated in system 201, the terminal 102-1 may transmit at $t_0$-40 microseconds to offset the delay caused by the motion of satellite 108. As previously mentioned, the terminal 102-1 transmits the terminal burst in the TDMA scheme to the gateway 110, sharing a frequency with the other terminals in the satellite communication network.

During stage (M), the IDM 114 receives the TDMA data structure 218 from the terminal 102-1. The IDM 114 can determine that the TDMA data structure 218 is expected to be receive based on a BTP, e.g., identifier indicating when a terminal burst is expected to be received from a particular terminal. As a result, the IDM 114 can determine that terminal 102-1 has transmitted the TDMA data structure 218 based on the time identified by the BTP.

During stage (N), the IDM 114 can retrieve the normal aperture window 220 from the aperture database 204. The IDM 114 can identify the normal aperture window 220 from the aperture database 204 by the identifier stored in the aperture database 204. For example, the IDM 114 can determine that terminal 102-1 is the terminal that transmitted the most recently received terminal burst using the identified BTP. Then, the IDM 114 can extract the generated aperture window 220 from the aperture database 204 using an identifier that identifies the terminal 102-1 and the corresponding generated aperture window 220. The IDM 114 applies this generated aperture window 220 as the aperture window to use for the next terminal burst the IDM 114 applies when a terminal burst is received.

During stage (O), the IDM 114 can provide the normal aperture window 220 to its correlation module. In the correlation module, the IDM 114 can perform a correlation on a portion of the TDMA data structure 218 identified by the normal aperture window 220. Additionally, the IDM 114 can retrieve a unique word from memory or a database that terminal 102-1 has been instructed to insert in its terminal burst once time synchronized with the gateway 110. For example, the unique word can be "UW" in symbol form or some other hexadecimal, plaintext, or byte value that both gateway 110 and terminal 102-1 have stored. In some implementations, the gateway 110 can instruct the terminal 102-1 to use a desired unique word.

In response to identifying the unique word and the normal aperture window 220, the IDM 114 can perform the correlation. Stage (D) is similar to stage (O), so the similar functionality between the two stages will not be repeated. As illustrated in the system 201, after the correlation has been performed, the IDM 114 determines that the timing delay corresponds to 2 microseconds. The timing delay of 2 microseconds is based on the shrunken aperture time window and the reduction in buffer period size in the terminal burst. For example, the portion of the TDMA data structure 218 includes "xx" in the buffer period instead of "xxxx" in the buffer period from system 200. This illustrative reduction in buffer period size indicates that the terminal 102-1 has reduced the buffer period length based on the timing delay correction 216.

During stage (P), in response to identifying the time delay by the correlation or convolution process, the IDM 114 provides the timing delay to the IGM 116. In some implementations, the IDM 114 can store the time delay and an identifier that identifies the terminal that transmitted the TDMA data structure 218 in memory and provide the location to the IGM 116. In some implementations, the IDM 114 can specifically provide the time delay and data that identifies the terminal, e.g., an IP address, MAC address, or other identifier, to the IGM 116.

During stage (Q), the IGM 116 receives the timing delay and information that identifies the terminal that transmitted the TDMA data structure 218. In some implementations, the IGM 116 generates a new aperture window based on the timing delay identified by the IDM 114. To calculate the new aperture window, the IGM 116 can first calculate a satellite drift and use the calculated satellite drift to calculate a reduced aperture length. For example, the IDM 114 is aware of the movement and position of the satellite 108 and can calculate a draft associated with the satellite movement.

Moreover, the satellite drift can be calculated across a set of N frames. As the gateway 110 can instruct the terminal 102-1 to use a particular aperture window for a set of N frames, the satellite drift across those N frames need to be calculated. Thus, in system 201 (and other systems), the maximum satellite drift can correspond to a 12 nanosecond drift per second. And in one example, for a frame size of 45 milliseconds, the total drift for "N" frames can be calculated using the below formula:

Satellite Drift for $N$ Frames=Satellite Drift per Second($d$)*Number of frames($N$)*Frames Size in Seconds($f$)     Equation 2

In Equation 2, the "Satellite Drift per Second" can correspond to 12 ns drift per second, the "Number of frames" can correspond to 22 frames in 1 second, and the "Frames Size in Seconds" can correspond to 45 milliseconds. Thus, plugging in the numbers, the total satellite drift in one second corresponds to: $12 \text{ ns/s}*45*10^{-3}*22=11.8$ nanoseconds. Other numbers can also be used to calculate the Satellite Drift across N frames.

Once the Satellite Drift number has been calculated, the IDM 114 can calculate the Reduced Aperture Length. For example, the Reduced Aperture Length can be calculated using the below formula:

Reduced Aperture Length=Terminal Timing Offset+ 2*Satellite Drift Calculated for $N$ Frames     Equation 3

In Equation 3, the goal for the IDM 114 is for the window of the reduced aperture length to be on either side of the determined timing offset. For example, if the IDM 114 can determine that terminal 102-1 has a timing offset of 1 microsecond and has been designated a configured value of N as 1000 frames. In this case, once the IGM 116 has received the determined timing offset from the IDM 114, the IGM 116 can calculate the reduced aperture length using Equation 3. In another example where the "Satellite Drift per Second" is 12 nanoseconds/s, the "Number of frames" is 1000, and the "Frame Size in Seconds" is 45 ms, the following can be calculate for the Satellite Drift:

$$\text{Satellite Drift} = 12\frac{\text{ns}}{\text{s}}*45*10^{-3}*1000 \text{ frames} = 540 \text{ nanoseconds} \quad \text{Equation 4}$$

Using the 540 nanoseconds satellite drift calculated from Equation 4, the reduced aperture length can be calculated with a terminal that has a timing offset of 1 microsecond.

Reduced Aperture Length for Next 1000 Frames=(1+ (2*540*10$^{-3}$)) µs=1+1.080=2.080µs     Equation 5

As calculated in Equation 5, the reduced aperture length for this example is 2.080 µs. Thus, the aperture window can correspond to a range of [$t_0$−1.04, $t_0$+1.04]. Given the reduced aperture length for the terminal, the aperture size in symbols can be calculated using the equation below:

$$\text{Aperture Size in Symbols} = \text{Symbol Rate}\left(\frac{\text{Symbols}}{\text{Seconds}}\right)*\text{Aperture Size (seconds)} \quad \text{Equation 6}$$

As indicated by Equation 6, the aperture size in symbols for a 2.080 µs over a 12 Mega-samples per second (Msps) channel would be the following:

$$\text{Aperture Size in Symbols} = 12*10^6\left(\frac{\text{symbols}}{\text{second}}\right)*2.080*10^{-6}(\text{seconds}) = 24.96 \text{ symbols} \quad \text{Equation 7}$$

Thus, for this particular example, Equation 7 indicates that for a reduced aperture size of 2.080 µs, the symbol length is 24.96 symbols. Consequently, the overall burst overhead also reduces significantly due to the reduced aperture size. The overall burst overhead corresponds to the buffer period, the ramp up, the unique word, the pilot and the ramp down—without the payload.

As illustrated in system 201, the IGM 116 determines the new aperture size using the above equations 2-7 to be 10 microseconds, which corresponds to a reduced aperture window of [$t_0$−5, $t_0$+5], where to corresponds to a subsequent terminal burst transmission for the corresponding terminal. In some implementations, the IGM 116 can generate the aperture window to fall on a slot boundary. For example, the newly generated aperture window falls at the center of a slot boundary or at a time where the terminal transmits the terminal burst in a slot. In other implementations, the IGM 116 can generate the aperture window to fall at the center of the unique word.

During stage (R), the IGM 116 generates a Burst Time Plan (BTP) that indicates to the IDM 114 when the next subsequent terminal burst is expected to be received for the terminal 102-1. The IGM 116 can generate a BTP for each terminal, and each terminal's BTP can be different from one another. Stage (R) is similar to stage (G).

During stage (S), the IGM 116 generates a Burst Allocation Plan (BAP) that indicates to the terminal 102-1 in which allocated slot the terminal 102-1 can start transmitting subsequent terminal bursts, e.g., assigned burst allocation. Stage (S) is similar to stage (H).

During stage (T), the IGM 116 transmits the reduced aperture window and the BTP to the IDM 114. The IDM 114 receives the generated aperture window and stores the generated aperture window in the aperture database 204. If the IDM 114 determines that an aperture window already exists for the particular terminal within the aperture database 204, then the IDM 114 overwrites the preexisting aperture window. Alternatively, the IDM 114 can store the newly generated aperture window and set the preexisting aperture window in a historical context or database. Stage (T) is similar to stage (I).

During stage (U), the IGM 116 generates data that instructs the particular terminal, e.g., terminal 102-1, to perform timing corrections on subsequent transmissions. As illustrated in system 201, the IGM 116 receives an indication that the time delay corresponds to 2 microseconds. In this case, the IGM 116 can indicate in the correction data that the terminal 102-1 is to shrink its buffer period by 1 symbol, for example. Other functions are also possible for correction. Stage (U) is similar to stage (L).

During stage (V), the terminal 102-1 receives the BAP 222 and the timing delay corrections 224 from the gateway 110. Stage (V) is similar to stage (K).

In some implementations, after the gateway 110 determines the initial timing offset and corresponding aperture window for a particular terminal for the first frame in N frames, the gateway 110 can make subtle adjustments to subsequent frames. For example, after the first frame is processed, the gateway 110 can adjust and correct the delay as long as the particular terminal continues to transmit. When the transmissions from the terminal ceases, e.g., a gap exists in terminal transmissions, the gateway 110 can return to using the larger or longer aperture to determine the new timing offset associated with the particular terminal. Each terminal can have different components and connect to different client devices, and as such will all have different timing offsets. Thus, each terminal in the system 201 (and other systems) has to be tracked separately and independently.

Figure 2C:
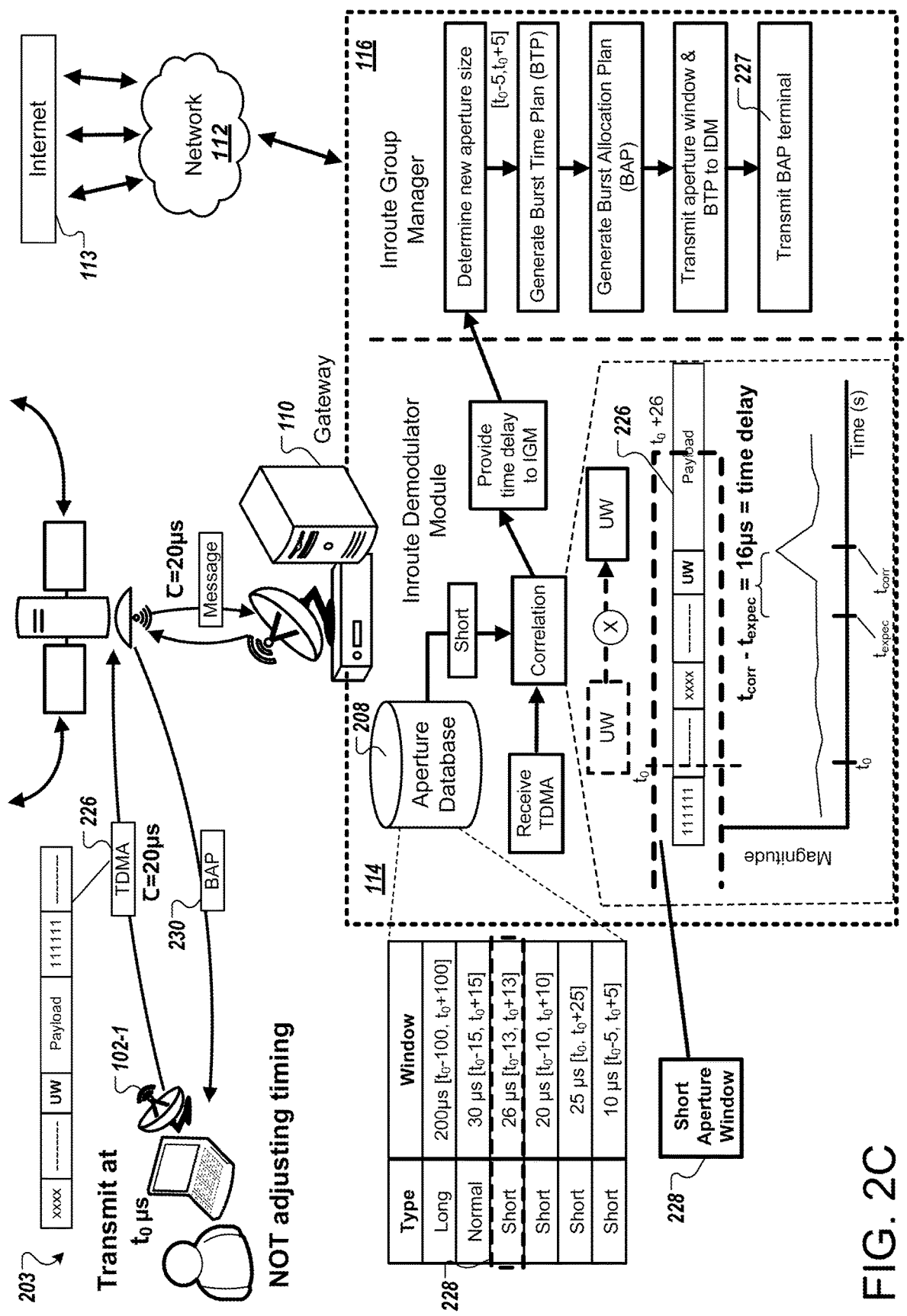

FIG. 2C is a block diagram that illustrates an example of a system 203 for adjusting a size of an aperture window using timing information. System 203 is similar to systems 200 and 201. As the processes performed in system 203 is similar to systems 200 and 201, only the differences will be discussed below.

In some implementations, in system 203, the terminal 102-1 transmits the TDMA data structure 226 to the gateway 110. The gateway 110, and more specifically the IDM 114, can receive the TDMA data structure 226 and identify which terminal the TDMA data structure 226 belongs to via the corresponding BTP. The IDM 114 can also retrieve the aperture window 228 from the aperture window database 208 that corresponds to the identified terminal that transmitted the TDMA data structure 226, e.g., terminal 102-1. The IDM 114 can also retrieve the corresponding unique word for this terminal burst and provide the aperture window, corresponding unique word, and the TDMA data structure 226 to the correlation module.

The correlation module within the IDM 114 can perform the correlation and determine the time delay for terminal 102-1 corresponds to 16 microseconds. The IDM 114 can provide the time delay of 16 microseconds to the IGM 116. The IGM 116 can generate a new aperture window using the time delay received from the IDM 114. Additionally, the IGM 116 can generate a BTP, a BAP, and can transmit the newly generated aperture window and the BTP to the IDM 114.

In the function 227, the IGM 116 only provides the BAP 230 to the terminal 102-1 and does not provide the timing correction information. In subsequent terminal burst transmissions, the terminal 102-1 will transmit terminal bursts with the same timing delay (of 16 microseconds, for example), at times indicated by the burst allocations in the BAP 230, and the terminal 102-1 will be unaware of this timing delay. Thus, the gateway 110 adjusts the aperture size and monitors the timing delay associated with each terminal without the cooperation of the terminals. The newly generated aperture window may be placed on a slot boundary.

Additionally, the adjustment of the newly generated aperture window may not be as large as the adjustment made by the gateway 110 in system 201. In system 203, the generated aperture window may need to be larger than the aperture window generated from system 201 to be able to handle the continuous timing delay found in subsequent terminal bursts transmitted by the terminal 102-1.

Figure 2D:
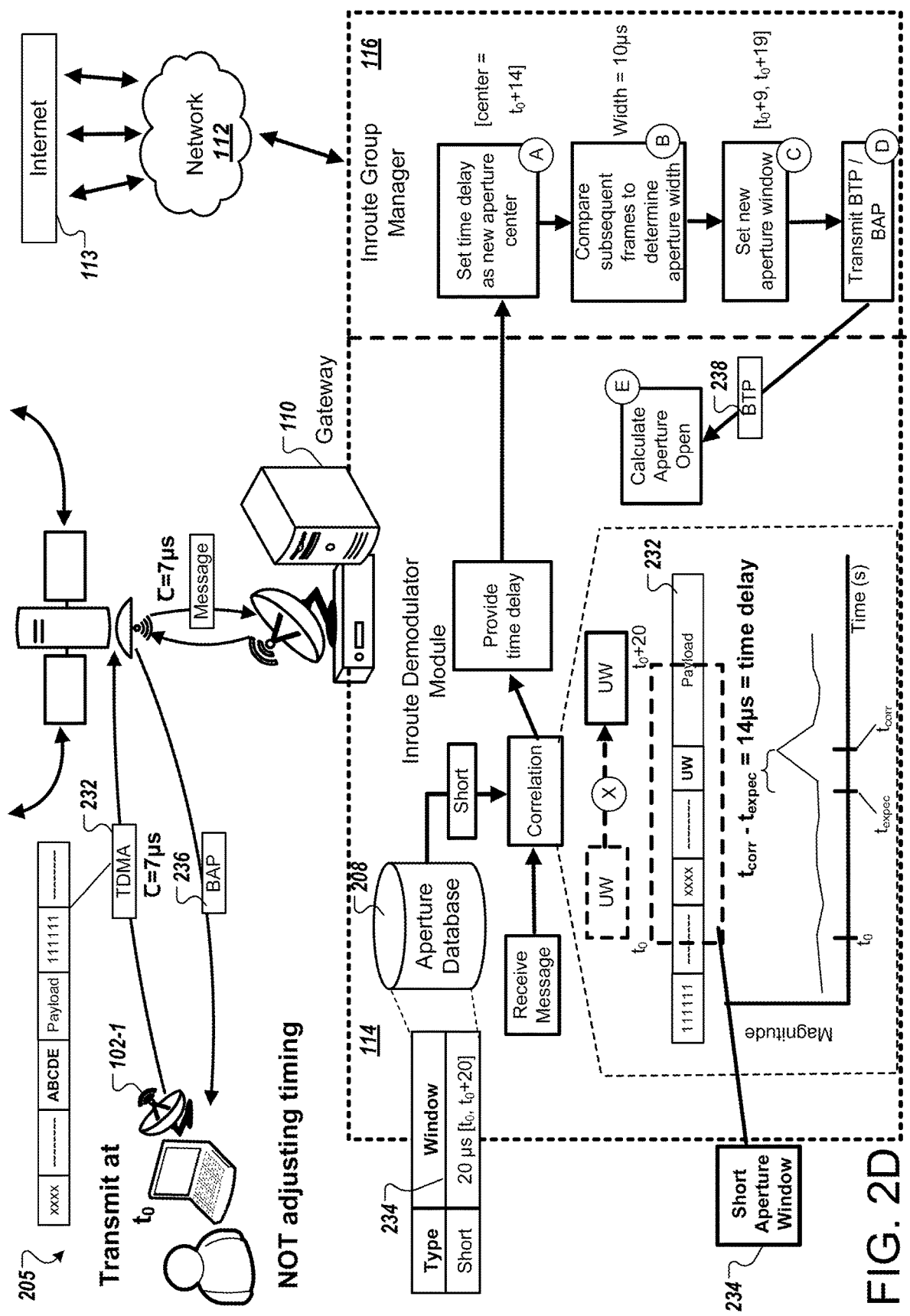

FIG. 2D is a block diagram that illustrates an example of a system 205 for adjusting a size of an aperture window using timing information. System 205 is similar to systems 200, 201, and 203; only the differences between systems 205 to the other systems will be discussed and described below. The system 205 uses a reduced aperture size based on the maximum satellite drift. Additionally, the system can adjust an aperture open symbol, which is used to define the first symbol where the unique word can begin and based on the determined terminal timing offset. FIG. 2D illustrates various operations in stages (A) through (E) which can be performed in the sequence indicated or in another sequence.

In system 205, similar to system 203, the terminal 102-1 transmits the TDMA data structure 232 to the gateway 110. The gateway 110 identifies the corresponding unique word and the corresponding aperture window 234, and provides the data to the correlation module within the IDM 114. The correlation module determines the time delay associated with the TDMA data structure 232 corresponds to 14 microseconds. The IDM 114 then transmits the determined time delay of 14 microseconds to the IGM 116 for processing.

In some implementations, each of the terminals 102 can transmit a TDMA data structure to the gateway. In this case, the gateway 110 can allocate an aperture for each of the TDMA data structures received from the terminals 102.

During stage (A), the IGM 116 determines the aperture window based on the maximum satellite drift. For example, the IGM 116 can set the determined time delay of 14 microseconds as the center of the new aperture window. The original aperture window 234 identified by the IDM 114 corresponds to a 20 microsecond window between $[t_0, t_0+20]$. Now that a timing delay of 14 microseconds has been identified, the IGM 116 can adjust the center of the original aperture window 234. Thus, the new aperture window now centered at $t_0+14$, the new aperture window becomes $[t_0+4, t_0+24]$, still with a length of 20 microseconds.

During stage (B), the IGM 116 can determine the new width of the aperture window based on the maximum satellite drift. In some implementations, the IGM 116 can determine the new width of the aperture window by performing the calculations associated with Equations 2 and 3 above, as discussed with regard to system 201. Alternatively, the reduction in aperture window width can also be calculated by the following equation:

Reduced Aperture Length=2*Satellite Drift Calculated for N Frames  Equation 8

In Equation 8, the IGM 116 can calculate the Reduced Aperture Length by multiplying two by the "Satellite Drift Calculated for N Frames", which is calculated with Equation 2 above. In other implementations, the IGM 116 can determine the new width of the aperture window by comparing the time delay identified by the IDM 114 between subsequent frames. The time delay between subsequent frames can indicate the drift of the satellite across frames, and subsequently, the time of the reduced aperture window. As illustrated in system 205, the IGM 116 determines the new width of the aperture window to be 10 microseconds.

During stage (C), the IGM 116 can adjust the window from [$t_0$+4, $t_0$+24] to have a new width of 10 microseconds to [$t_0$+9, $t_0$+19], yet still centered on $t_0$+14. Thus, the new aperture window has been adjusted to account for the maximum satellite drift and is still centered on the terminal's timing offset.

During stage (D), the IGM 116 generates BTP 238 and BAP 236. The generation of the BTP 238 and the BAP 236 is similar to stages (G), (H), (R), and (S). In response to generating the BTP 238 and BAP 236 for the corresponding terminal, the IGM 116 provides the BTP 238 to the IDM 114 and the BAP 236 to the terminal 102-1. Stage (D) is also similar to the function 227 of system 203. The IGM 116 does not transmit timing correction information back to the terminal 102-1. Additionally, the IGM 116 can provide the newly adjusted aperture window of [$t_0$+9, $t_0$+19] to the IDM 114.

During stage (E), the IDM 114 can receive the BTP 238 and the newly adjusted aperture window [$t_0$+9, $t_0$+19]. The IDM 114 can then calculate the new open aperture symbol using the terminal's determined timing offset and the length of the newly adjusted aperture window. The IDM 114 calculates the new open aperture symbol for each terminal. For example, the IDM 114 can use the following formula to calculate the aperture open symbol:

$$\text{Aperture Open Symbol} = \quad \text{Equation 9}$$
$$(\text{Number of Symbols in Frame} * \text{Frame number}) +$$
$$(\text{Start Slot Number} + 1) *$$
$$\left(\frac{\text{Number of Symbols}}{\text{Slot}}\right) - \left(\frac{\text{Aperture Length in Symbols}}{2}\right) -$$
$$\text{Unique Word Symbol Length} + \text{Timing Offset in Symbols} + 9$$

In Equation 9, the terminal timing offset is calculated from the end edge of the first slot in a frame. Thus, the terminal timing offset can be either a positive or negative number based on the relative offset from the end edge of the first slot. Therefore, by adding the "Timing Offset in Symbols" to the overall calculation of the aperture open symbol, the aperture open symbol result would center around the determining terminal timing offset, e.g., 14 microseconds in this case. Additionally, along with the reduced aperture length determined in stage (C) of system 205, the overhead within the terminal burst reduces significantly.

In one example calculation for Equation 9, assume a negative timing offset is calculated. The negative timing offset corresponds to the timing that occurs before the end edge of the first slot, and a 1 microsecond timing offset in symbols would correspond to 12.288 symbols. Additionally, assume the frame number is 0, start slot number is 3, the number of symbols in frame is 552960 symbols, and the number of symbols in the unique word is 40. The equation would result in the following:

$$\text{Aperture Open Symbol} =$$
$$(552960 * 0) + (3 + 1) * (120) - \left(\frac{24.96}{2}\right) - 40 + (-12.288) + 9 =$$
$$424.232 \text{ symbols}$$

Thus, the start of the aperture open is approximately 425 symbols instead of 269 symbols in the case of the fixed 30 microseconds aperture size without centering the aperture at the timing offset. This saves more symbols to be used for transmission. The IDM 114 is now adjusted with the new aperture open calculation. Additionally, the terminal 102-1 does not adjust the buffer period size for subsequent terminal transmissions.

In some implementations, the dynamic aperture resizing performed by the system 205 is more complex than the aperture resizing performed by the systems 200, 201, and 203. The reason is because the IDM 114 is performing an aperture open symbol shift for each terminal, which requires more resources for computing and tracking purposes. Thus, not only does the gateway 110 have to change the sizes of the aperture's for each terminal, but also the position or the corresponding aperture centers are also different with respect to the other aperture windows for the different terminals. Thus, the complexity is higher in terms of demand on the gateway 110 in system 205.

Figure 3:
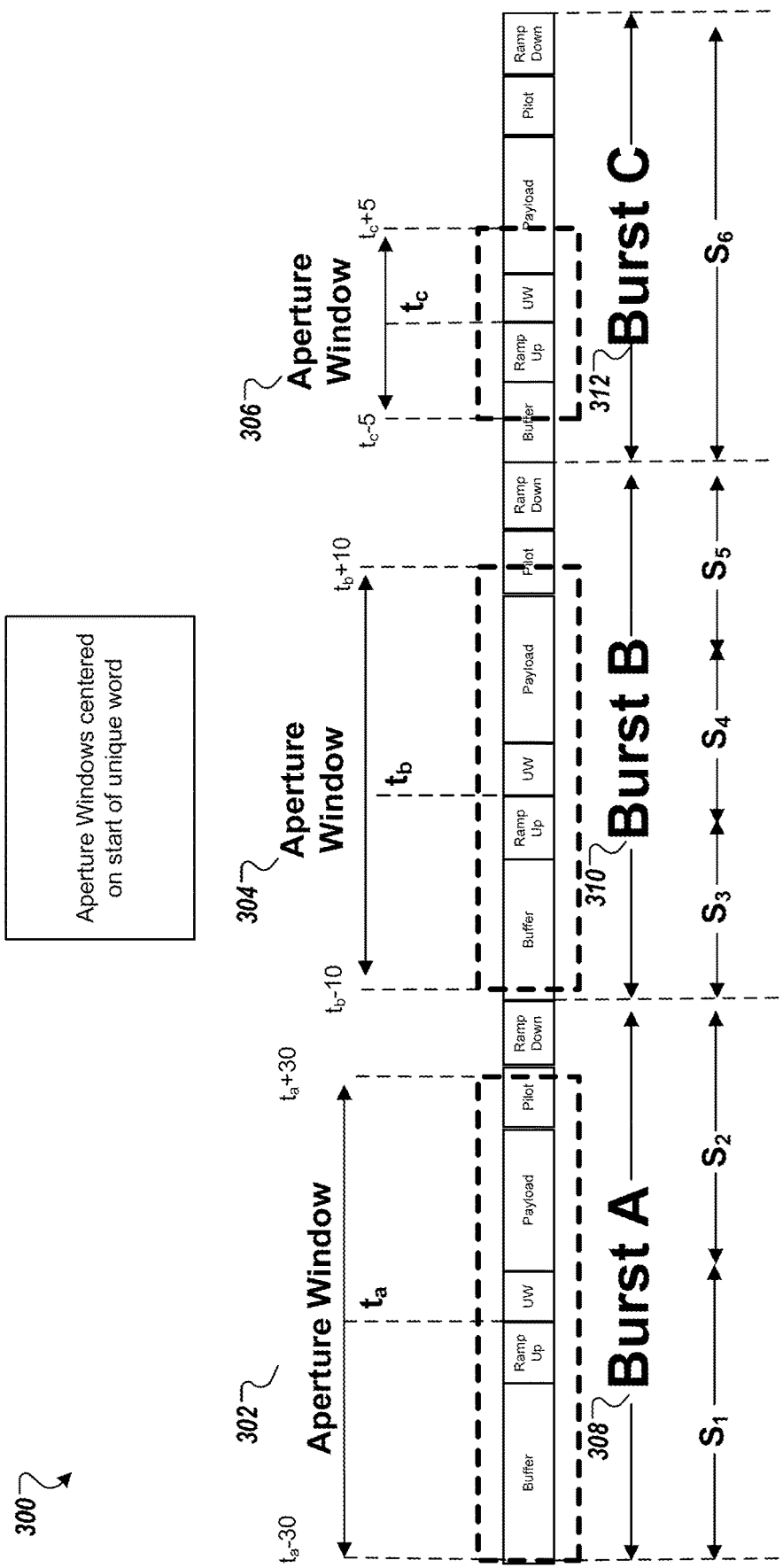
FIG. 3 is a block diagram that illustrates an example of aperture windows applied to multiple slots from various terminals.

FIG. 3 is a block diagram 300 that illustrates an example of aperture windows applied to multiple burst allocations from various terminals. The block diagram 300 illustrates a portion of one or more frames, that includes three allocations—allocation $BA_1$ 308, allocation $BA_2$ 310, and allocation $BA_3$ 312. These three allocations are continuous in time and are placed next to one another, e.g., in series or sequence with one another. The composition of each allocation is similar to the composition illustrated in FIG. 1B. Namely, each of the allocations include a buffer period, a radio ramp up, a unique word, a payload, pilot symbols, and a radio ramp down.

In some implementations, the block diagram 300 also includes various aperture windows determined by a gateway. As illustrated by the block diagram 300, the aperture windows, e.g., aperture windows 302, 304, and 306, are centered on the start of the unique word identified by the gateway in each of the terminal bursts. In some implementations, the aperture windows can also be centered on either the end of a unique word or on a slot boundary between terminal bursts.

Aperture window 302 includes a length of 60 microseconds ranging from [$t_0$–30, $t_0$+30]. The center of the aperture window 302 corresponds to $t_a$, e.g., a time offset from the transmission time of the terminal burst A 308 based on the burst allocation for terminal A. Aperture window 304 includes a length of 20 microseconds ranging from [$t_0$–10, $t_0$+10]. The center of the aperture window 304 corresponds to $t_b$, e.g., a time offset from the transmission time of the terminal burst B 310 based on the burst allocation for terminal B. Lastly, aperture window 306 includes a length of 10 microseconds ranging from [$t_0$–5, $t_0$+5]. The center of the aperture window 306 corresponds to $t_c$, e.g., a time offset from the transmission time of the terminal burst C 312 based on the burst allocation for terminal C.

The block diagram 300 shows that the gateway 110 can designate different aperture size windows for different terminal bursts within the same frame and across multiple frames. For example, if three different terminals are instructed by the gateway 110 to insert their respective terminal bursts into adjacent burst allocations, namely burst allocations 308, 310, and 312, then the gateway 110 can apply different aperture windows to each of the different terminal bursts, e.g., aperture windows 302, 304, and 306. Moreover, the gateway 110 can apply different aperture windows to each of the adjacent terminal bursts to detect their corresponding unique word.

As illustrated in system 300, each terminal burst, e.g., terminal burst A 308, terminal burst B 310, and terminal burst C 312 includes a different number of slots. For example, terminal burst A 308 includes slot 1 and slot 2; terminal burst B 310 includes slot 3, slot 4, and slot 5; and, terminal burst C 312 includes slot 6. The number of slots included in the terminal bursts shown illustrated in system 300 are only exemplary, as terminal bursts may include more or less slots than those shown. As previously indicated, the number of slots included in a terminal burst can vary based on the symbol rate of the terminal burst associated with the terminal and the number of symbols in a frame, e.g., as indicated by Table 1.

In some cases, each of the aperture windows can overlap one or more of the terminal bursts. For example, aperture window 302 may overlap a portion of the terminal burst B 310. Aperture window 304 can overlap a portion of the terminal burst A 308 and a portion of the terminal burst B 310. Lastly, aperture window 306 can overlap a portion of the terminal burst B 310 and a portion of the terminal burst C 312. In other examples, the aperture windows may not overlap with previous and subsequent terminal bursts. Although each of the aperture windows can overlap one or more terminal bursts (in one or more slots), each of the aperture windows cover the unique word that they are determined to detect. Moreover, each of the aperture windows can correspond to a time window in which the gateway 110 (and more specifically the IDM) seeks to detect the start of the unique word. By detecting the start of the unique word, the gateway can deem a terminal burst has been detected.

Figure 4:
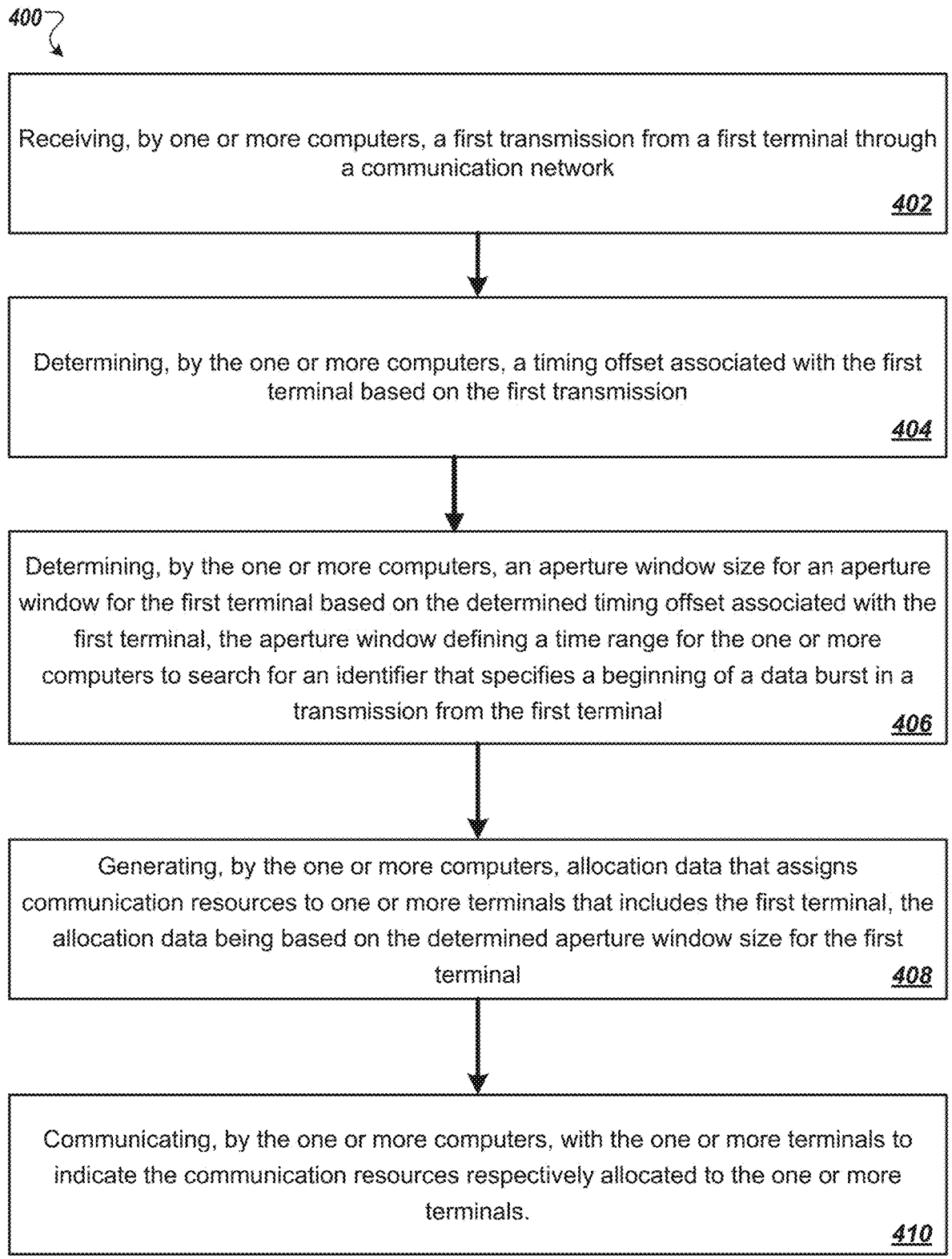
FIG. 4 is a flow diagram that illustrates an example of a process for adjusting a size of an aperture window using timing information.

FIG. 4 is a flow diagram that illustrates an example of a process 400 for adjusting a size of an aperture window using timing information. The process 400 can be performed by a gateway, such as gateway 110 illustrated in FIGS. 1A and 1C.

In the process 400, the gateway can receive a first transmission from a first terminal through a communication network (402). The communication network can be a satellite communication network. The terminals and the gateway communicate in a TDMA communication scheme. For example, the terminals transmit information in a TDMA data structure which is composed of multiple frames. Each frame is composed of a designated number of slots and each terminal is assigned a continuous number of slots for transmitting their data or terminal burst. The terminal burst can include a set of symbols that include payload data, such as video media, audio, and image data. Additionally, the terminal burst's set of symbols can also include control information such as a radio on, a unique word or identifier, radio down, and pilot data. Additionally, the terminals can insert a buffer period or an overhead at the forefront of each terminal burst, e.g., and in-between subsequent terminal burst, that is adjustable in size.

The gateway can receive a first transmission from a first terminal, such as receiving a terminal burst from a particular terminal at its designated burst allocation. The gateway can receive the terminal burst from the particular terminal and determine which terminal transmitted the burst based on a time when the burst is received.

The gateway can determine a timing offset associated with the first terminal based on the first transmission (404). In response to the gateway receiving the first transmission, the gateway can perform one or more function to detect a terminal burst. For example, the gateway can retrieve an aperture window from an aperture database and search for an identifier in the first transmission within a time range identified by the aperture window. The aperture window can be a long aperture window, a normal aperture window, or a short aperture window. For example, the gateway can perform a correlation to search for the identifier, e.g., the unique word, in the terminal burst. The unique word can be unique to that particular terminal, e.g., the first terminal.

After performing the correlation between the unique word and the data in the first transmission to locate the unique word, the gateway can determine the timing offset associated with the first terminal. In particular, the gateway knows the time at which the terminal transmitted the terminal burst based on the designated burst allocation for the TDMA scheme and can determine the expected time to receive the terminal burst. The expected time to receive the terminal is based on the time at which the terminal burst was transmitted, a calculated delay between the terminal, the satellite, and the gateway, and a length of time that equals the summed length of time for the buffer period, the ramp up, and the unique word. The gateway can subtract the time identified by the correlation, e.g., identifying the end of the unique word by a peak, with the expected time to determine the timing offset associated with that terminal.

The gateway can determine an aperture window size for an aperture window for the first terminal based on the determined timing offset associated with the first terminal, the aperture window defining a time range for the gateway to search for an identifier that specifies a beginning of a data burst in a transmission from the first terminal (406). For example, in response to the gateway determining the timing offset for the terminal, the gateway can provide the timing offset to an inroute group manager, e.g., within the gateway, that determines an aperture window size for an aperture window. For example, in the case that a long aperture window was originally used, e.g., when the terminal first seeks to connect with the gateway, the gateway can adjust a size of the long aperture window to be of a normal aperture size, such as from 200 microseconds to 30 microseconds, e.g., [$t_0-15$, $t_0+15$], where to corresponds to subsequent terminal burst transmissions for the corresponding terminal. The gateway seeks to adjust the aperture window size of the aperture window based on the determined timing offset to synchronize transmission and reception timing between the gateway and the corresponding terminal. The gateway can adjust the aperture window size of the aperture window associated with each terminal.

In the case where the gateway is using a normal aperture window for a particular terminal, the gateway can adjust size of the normal aperture window to a small aperture window. For example, the gateway can determine the new aperture size window using equations 2-7 discussed above, to create the small aperture window. Generally, the gateway can determine a new aperture window to fall on a slot boundary of subsequent terminal burst transmission or at a time that corresponds to the center of a unique word in the terminal burst.

In another case where the gateway adjusts not only the aperture window size for an aperture window but also the center of the aperture window, the gateway can perform different operations for adjusting these parameters. In particular, the gateway can determine the size of an aperture window based on the maximum satellite drift. For example, the gateway can first set the center of the aperture window to the determined timing offset, e.g., 15 microseconds from to, where to corresponds to the transmission time of the terminal burst for the terminal. Then, using the aperture window that was used to determine the timing offset of 15 microseconds, e.g., aperture window of $[t_0, t_0+20]$, the gateway can adjust the size of this aperture window accordingly. For example, the new aperture window can be centered at $[t_0+15]$, and have a new aperture window of $[t_0+5, t_0+20]$, still with a length of 20 microseconds.

Then, the gateway can determine the new width of the aperture window. For example, the gateway can determine the new width of the aperture window using Equations 2, 3, or 8, as discussed above. For example, the new width of the aperture can be determined to be 10 microseconds, and consequently, the new aperture window can be determined to be $[t_0+10, t_0+20]$, still centered on $[t_0+15]$. Each of these newly generated aperture windows can be used by the gateway in subsequent terminal transmissions to improve the synchronization between an associated terminal and the gateway. Ideally, a synchronized terminal and gateway will occur when no delay exists between the expected time, e.g., expected time when the end of the unique word is found, and the time the end of the unique word is actually identified. This is also true for the case where the center of the unique word is used instead of the slot boundary.

The gateway can generate allocation data that assigns communication resources to one or more terminals that includes the first terminal, the allocation data being based on the determined aperture window size for the first terminal (408). After generating the new aperture window, the gateway can generate a Burst Time Plan (BTP) that indicates to an inroute demodulator module within the gateway a future time that the next subsequent terminal burst is to be received from the corresponding terminal, e.g., based on the terminal the determined aperture window was determined for. The BTP can be determined based on a variety of factors such as, for example, time of travel of the terminal burst, a time generated by the gateway that indicates when the terminal is to transmit subsequent terminal bursts, a time delay accounted for by the satellite drift, and the determined timing offset.

The gateway also determines a Burst Allocation Plan (BAP) that indicates to the corresponding terminal in which designated burst allocation the corresponding terminal can transmit subsequent terminal bursts. The gateway may use future unused slots at burst allocations or times identified during the generation of the BTP. In some implementations, the gateway stores the BTP to determine a time in which the next subsequent terminal burst for a particular terminal will be received by the gateway. Thus, when the gateway receives the next terminal burst, the gateway can identify through the BTP which terminal transmitted the terminal burst based on the time of reception and transmission and extract the corresponding generated aperture window for detecting the terminal burst, e.g., by detecting the end of the unique word. This process occurs for the next N or preconfigured amount of frames for that particular terminal.

The gateway can communicate with the one or more terminals to indicate the communication resources respectively allocated to the one or more terminals (410). In some implementations, the gateway can provide correction data that instructs the corresponding terminal to shrink or adjust the overhead or buffer period for subsequent terminal bursts to improve the synchronization between that terminal and the gateway. The correction data can also include the determined timing offset, in which the terminal can make adjustments to the buffer period or overhead using the received timing offset. The gateway can also communicate the BAP to the corresponding terminal through the satellite communication network.

Thus, when the gateway receives the next subsequent terminal burst from the terminal that has received the correction data and the BAP, the gateway can retrieve the BTP for that terminal and the corresponding normal aperture window. The gateway can also retrieve the corresponding unique word for that terminal and perform a correlation to identify the unique word in the received subsequent terminal burst. The gateway can determine that the timing offset is now much smaller than the previous timing offset, e.g., 3 microseconds rather than 15 microseconds, due to the shrunken aperture window and the reduction in buffer period size associated with the terminal burst.

In some cases, the gateway does not provide the correction data back to the terminal and the terminal continues to transmit subsequent terminal bursts with the timing offset. The gateway does transmit the BAP to the terminal in each case so the terminal knows in which designated burst allocation to transmit subsequent terminal bursts. Rather, the gateway is aware of the timing delay for future subsequent terminal bursts but the terminal is unaware of the timing delay. Thus, the gateway continues to adjust the aperture size and monitor the timing delay associated with each terminal without cooperation of the terminal. Additionally, the gateway may adjust the center and width of the aperture window for a particular terminal without providing timing correction information for subsequent terminal bursts.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving, by the one or more computers, a transmission from each of multiple terminals through a communication network;
   determining, by the one or more computers, separate timing offsets for the multiple terminals, wherein, for the each of the multiple terminals, the timing offset for the terminal is based on the transmission received from the terminal;
   determining, by the one or more computers, separate aperture window sizes for the multiple terminals, wherein, for the each of the multiple terminals, the aperture window size for the terminal (i) is determined based on the timing offset determined for the terminal and (ii) specifies a size of an aperture window that provides a time range to search for an identifier that specifies a beginning of a data burst in a transmission from the terminal;
   generating, by the one or more computers, allocation data that assigns communication resources to the multiple terminals, wherein the assignment of the communication resources sets a timing of data bursts to account for utilization of different aperture window sizes for different terminals of the multiple terminals, with the communication resources being assigned based on the separate aperture window sizes determined for the multiple terminals; and
   communicating, by the one or more computers, with the multiple terminals to indicate the communication resources respectively allocated to the multiple terminals.

2. The method of claim 1, wherein the one or more computers comprises one or more computers of a satellite gateway.

3. The method of claim 1, wherein communicating with the multiple terminals to indicate the communication resources respectively allocated to the multiple terminals further comprises providing, by the one or more computers, second data representing the separate timing offsets to the multiple terminals such that the each of the multiple terminals is provided the timing offset determined for the terminal.

4. The method of claim 3, further comprising:
   providing, by a first terminal of the multiple terminals, another transmission that comprises timing adjustments based on the allocation data generated by the one or more computers, wherein the timing adjustments include adjustments to a buffer period or overhead between data bursts.

5. The method of claim 4, further comprising:
   receiving, by the one or more computers, the other transmission from the first terminal through the communication network;
   determining, by the one or more computers, another timing offset associated with the first terminal based on the other transmission, wherein the determined other timing offset is smaller than a previous timing offset provided by the one or more computers to the first terminal; and determining, by the one or more computers, another aperture window size for the first terminal based on the determined other timing offset associated with the first terminal, wherein the other aperture window size specifies a size of a second aperture window that provides a second time range to search for a second identifier that specifies a beginning of a data burst in a subsequent transmission from the first terminal, wherein searching for the second identifier further comprises:

correlating, by the one or more computers, the second identifier with one or more signals in the subsequent transmission during the other aperture window to identify the second identifier.

6. The method of claim 1, wherein determining the separate aperture window sizes for the multiple terminals comprises:

adjusting, by the one or more computers, the separate aperture window sizes of the aperture windows using the separate timing offsets associated with the multiple terminals to synchronize timing of communication with the multiple terminals.

7. The method of claim 1, wherein the separate timing offsets associated with the multiple terminals comprise, for the each terminal of the multiple terminals, (i) a time difference between a time a message from the terminal is received and an expected time for the message from the terminal to be received and (ii) a time delay associated with a drift of a satellite in a communication pathway between the terminal and the one or more computers.

8. The method of claim 1, wherein generating the allocation data comprises allocating resources for data bursts to be transmitted by the multiple terminals, wherein the allocation for each data burst comprises allocation time for (i) an overhead portion, (ii) radio ramp up, (iii) the identifier, (iv) a data payload for the data burst, (v) one or more pilot symbols, and (vi) radio ramp down.

9. The method of claim 1, wherein receiving the transmissions from the multiple terminals comprises:

in response to receiving a first transmission from a first terminal, accessing, by the one or more computers, a first aperture window from an aperture window database, the aperture window database comprising data representing a plurality of aperture windows, the first aperture window having an aperture window size shorter than a previous aperture window provided by the one or more computers for the first terminal;

correlating, by the one or more computers, an identifier assigned to the first terminal against one or more data bursts in the first transmission within a time range identified by the first aperture window;

identifying, by the one or more computers, a correlation time associated with an end symbol of the identifier for the first terminal from the correlation; and determining, by the one or more computers, a timing offset for the first terminal by comparing the correlation time to an expected time, where the expected time represents a time the one or more computers expects to identify a data burst for the first terminal, the expected time comprising a time the data burst is expected to be received, a length of time for an overhead portion, a length of time for data representing a radio on, and a length of time for the identifier.

10. The method of claim 9, further comprising:

in response to determining the timing offset for the first terminal by comparing the correlation time to the expected time, generating, by the one or more computers, a burst time plan (BTP) that indicates when the one or more computers is expected to receive subsequent data bursts from the first terminal and the first terminal the subsequent data bursts belong to, the BTP corresponding to an aperture window for the first terminal;

generating, by the one or more computers, a burst allocation packet (BAP) that indicates a burst allocation time when the first terminal is to insert a subsequent data burst into a slot in third data;

providing, by the one or more computers, the separate timing offsets for the multiple terminals to the multiple terminals such that the each of the multiple terminals is provided the timing offset determined for the terminal;

providing, by the one or more computers, the BAP to the first terminal; and in response to receiving the third data from the multiple terminals, processing, by the one or more computers, the third data using the generated BTP.

11. The method of claim 10, wherein processing the third data using the BTP further comprises:

processing, by the one or more computers, the third data using the BTP, and the one or more computers continues processing subsequent received data from the first terminal for a set number of frames;

in response to receiving the set number of frames, applying, by the one or more computers, a general aperture window for the first terminal for processing a next frame of data;

adjusting, by the one or more computers, a size of the general aperture window based on a current timing offset for the first terminal to obtain an adjusted size of the general aperture window; and applying, by the one or more computers, the adjusted size of the general aperture window for the set number of frames in the subsequent received data bursts for the first terminal.

12. The method of claim 9, further comprising:

in response to determining the timing offset for the first terminal by comparing the correlation time to the expected time, generating, by the one or more computers, a burst time plan (BTP) that indicates when the one or more computers is expected to receive subsequent data bursts from the first terminal and the first terminal the subsequent data bursts belong to, the BTP corresponding to the first aperture window for the first terminal;

generating, by the one or more computers, a burst allocation packet (BAP) that indicates a burst allocation time when the first terminal is to insert a subsequent data burst into a slot in third data;

providing, by the one or more computers, the BAP to the first terminal; and in response to (i) providing the BAP to the first terminal, (ii) not providing the timing offset to the first terminal, and (iii) receiving the third data from the multiple terminals, processing, by the one or more computers, the third data using the generated BTP, wherein the third data includes a second timing offset, and a difference between the second timing offset and the determined timing offset found in the first transmission is within a threshold.

13. The method of claim 9, further comprising:

in response to determining the timing offset for the first terminal by comparing the correlation time to the expected time, adjusting, by the one or more computers, a center of a second aperture window to a time determined using the determined timing offset;

determining, by the one or more computers, a width of the second aperture window by comparing multiple timing offsets for the first terminal, the determined width of the second aperture window corresponding to a delay caused by drift of a satellite with which the multiple terminals communicate; and designating, by the one or more computers, a new aperture window for subsequent received slots for the first terminal using the adjusted center and the determined width.

14. The method of claim 1, wherein, for the each of the multiple terminals, the aperture window for the terminal is centered on either (i) a boundary between two slots in a frame or (ii) at an end of an identifier in a data burst.

15. The method of claim 1, comprising monitoring, by the one or more computers, for subsequent transmissions from the multiple terminals based on the separate aperture window sizes, including using aperture windows having different aperture window sizes according to the separate aperture window sizes determined for the multiple terminals.

16. The method of claim 1, comprising assigning the communication resources for each of the multiple terminals, such that each terminal of the multiple terminals receives a burst allocation with a timing that accounts for the determined aperture window size for the terminal.

17. A system comprising:
one or more computers and one or more storage devices storing instructions that are operable, when executed by the one or more computers, to cause the one or more computers to perform operations comprising:
receiving, by the one or more computers, a transmission from each of multiple terminals through a communication network;
determining, by the one or more computers, separate timing offsets for the multiple terminals, wherein, for the each of the multiple terminals, the timing offset for the terminal is based on the transmission received from the terminal;
determining, by the one or more computers, separate aperture window sizes for the multiple terminals, wherein, for the each of the multiple terminals, the aperture window size for the terminal (i) is determined based on the timing offset determined for the terminal and (ii) specifies a size of an aperture window that provides a time range to search for an identifier that specifies a beginning of a data burst in a transmission from the terminal;
generating, by the one or more computers, allocation data that assigns communication resources to the multiple terminals, wherein the assignment of the communication resources sets a timing of data bursts to account for utilization of different aperture window sizes for different terminals of the multiple terminals, with the communication resources being assigned based on the separate aperture window sizes determined for the multiple terminals; and
communicating, by the one or more computers, with the multiple terminals to indicate the communication resources respectively allocated to the multiple terminals.

18. The system of claim 17, wherein the one or more computers comprise one or more computers of a satellite gateway.

19. The system of claim 18, wherein communicating with the multiple terminals to indicate the communication resources respectively allocated to the multiple terminals further comprises providing, by the one or more computers, second data representing the separate timing offsets to the multiple terminals such that the each of the multiple terminals is provided the timing offset determined for the terminal.

20. The system of claim 19, further comprising:
providing, by a first terminal of the multiple terminals, another transmission that comprises timing adjustments based on the allocation data generated by the one or more computers, wherein the timing adjustments include adjustments to a buffer period or overhead between data bursts.

21. The system of claim 20, further comprising:
receiving, by the one or more computers, the other transmission from the first terminal through the communication network;
determining, by the one or more computers, another timing offset associated with the first terminal based on the other transmission, wherein the determined other timing offset is smaller than a previous timing offset provided by the one or more computers to the first terminal; and
determining, by the one or more computers, another aperture window size for the first terminal based on the determined other timing offset associated with the first terminal, wherein the other aperture window size specifies a size of a second aperture window that provides a second time range for the one or more computers to search for a second identifier that specifies a beginning of a data burst in a subsequent transmission from the first terminal, wherein searching for the second identifier further comprises:
correlating, by the one or more computers, the second identifier with one or more signals in the subsequent transmission during the other aperture window to identify the second identifier.

22. One or more non-transitory computer-readable media storing software comprising instructions that are executable by one or more computers to cause the one or more computers to perform operations comprising:
receiving, by the one or more computers, a transmission from each of multiple terminals through a communication network;
determining, by the one or more computers, separate timing offsets for the multiple terminals, wherein, for the each of the multiple terminals, the timing offset for the terminal is based on the transmission received from the terminal;
determining, by the one or more computers, separate aperture window sizes for the multiple terminals, wherein, for the each of the multiple terminals, the aperture window size for the terminal (i) is determined based on a timing offset determined for the terminal and (ii) specifies a size of an aperture window that provides a time range to search for an identifier that specifies a beginning of a data burst in a transmission from the terminal;
generating, by the one or more computers, allocation data that assigns communication resources to the multiple terminals, wherein the assignment of the communication resources sets a timing of data bursts to account for utilization of different aperture window sizes for different terminals of the multiple terminals, with the communication resources being assigned based on the separate aperture window sizes determined for the multiple terminals; and communicating, by the one or more computers, with the multiple terminals to indicate the communication resources respectively allocated to the multiple terminals.

\* \* \* \* \*

UNITED STATES PATENT AND TRADEMARK OFFICE
CERTIFICATE OF CORRECTION

PATENT NO.        : 12,284,633 B2
APPLICATION NO.   : 17/385074
DATED             : April 22, 2025
INVENTOR(S)       : Nimesh P. Ambeskar, Ashritha Mohan Ram and John Border Page 1 of 1

It is certified that error appears in the above-identified patent and that said Letters Patent is hereby corrected as shown below:

In the Claims

In Column 38, Claim 22, Line 56, please delete "(i}" and insert -- (i) --

Signed and Sealed this
Tenth Day of June, 2025

Coke Morgan Stewart
*Acting Director of the United States Patent and Trademark Office*